US011115144B2

(12) United States Patent
Shin et al.

(10) Patent No.: US 11,115,144 B2
(45) Date of Patent: *Sep. 7, 2021

(54) CELL SEARCH METHOD IN WIRELESS COMMUNICATION SYSTEM AND APPARATUS THEREFOR

(71) Applicant: LG ELECTRONICS INC., Seoul (KR)

(72) Inventors: Seokmin Shin, Seoul (KR); Yunjung Yi, Seoul (KR); Seonwook Kim, Seoul (KR); Bonghoe Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 29 days.

This patent is subject to a terminal disclaimer.

(21) Appl. No.: 16/738,724

(22) Filed: Jan. 9, 2020

(65) Prior Publication Data

US 2020/0153530 A1  May 14, 2020

Related U.S. Application Data

(63) Continuation of application No. 15/760,587, filed as application No. PCT/KR2016/010427 on Sep. 19, 2016, now Pat. No. 10,560,208.

(Continued)

(51) Int. Cl.
*H04J 11/00* (2006.01)
*H04L 27/26* (2006.01)
(Continued)

(52) U.S. Cl.
CPC ........ *H04J 11/0069* (2013.01); *H04L 5/0048* (2013.01); *H04L 12/189* (2013.01);
(Continued)

(58) Field of Classification Search
CPC ... H04L 1/0042; H04L 5/0048; H04L 12/189; H04J 11/0069

See application file for complete search history.

(56) References Cited

U.S. PATENT DOCUMENTS

2013/0195043 A1  8/2013  Chen et al.
2014/0211670 A1  7/2014  Alex et al.
(Continued)

FOREIGN PATENT DOCUMENTS

KR    101132913    4/2012
WO    2013112032   1/2013
(Continued)

OTHER PUBLICATIONS

U.S. Appl. No. 15/760,587, Office Action dated May 9, 2019, 12 pages.

(Continued)

*Primary Examiner* — Kevin M Cunningham
(74) *Attorney, Agent, or Firm* — Lee, Hong, Degerman, Kang & Waimey

(57) ABSTRACT

A cell search method of a terminal in a wireless communication system, comprises: a step of receiving a narrow band synchronization signal through a narrow band from a base station; and a step of acquiring time synchronization and frequency synchronization with the base station on the basis of the narrow band synchronization signal and detecting an identifier of the base station, wherein the narrow band has a system bandwidth of 180 kHz and includes twelve carriers arranged at intervals of 15 kHz, and the narrow band synchronization signal consists of a first narrow band synchronization signal and a second narrow band synchronization signal, wherein the first narrow band synchronization signal can be transmitted in a sixth subframe of a radio frame (Continued)

and the second narrow band synchronization signal can be transmitted in a tenth subframe of the radio frame.

15 Claims, 28 Drawing Sheets

Related U.S. Application Data

(60) Provisional application No. 62/219,067, filed on Sep. 15, 2015, provisional application No. 62/222,788, filed on Sep. 24, 2015, provisional application No. 62/267,219, filed on Dec. 14, 2015.

(51) Int. Cl.
*H04L 5/00* (2006.01)
*H04L 12/18* (2006.01)
*H04W 56/00* (2009.01)
*H04W 72/04* (2009.01)

(52) U.S. Cl.
CPC ...... *H04L 27/2613* (2013.01); *H04L 27/2692* (2013.01); *H04W 56/001* (2013.01); *H04W 72/0446* (2013.01)

(56) References Cited

U.S. PATENT DOCUMENTS

| | | |
|---|---|---|
| 2015/0200758 A1 | 7/2015 | Wakabayashi |
| 2015/0201432 A1 | 7/2015 | Rong et al. |
| 2015/0373624 A1 | 12/2015 | Webb et al. |
| 2017/0034798 A1* | 2/2017 | Lin .................. H04L 5/001 |
| 2018/0227148 A1 | 8/2018 | Chatterjee et al. |
| 2018/0278355 A1 | 9/2018 | Shin et al. |

FOREIGN PATENT DOCUMENTS

| | | |
|---|---|---|
| WO | 2013115571 | 8/2013 |
| WO | 2014049325 | 4/2014 |

OTHER PUBLICATIONS

PCT International Application No. PCT/KR2016/010427, International Search Report dated Dec. 29, 2016, 6 pages.

3rd Generation Partnership Project (3GPP), "Technical Specification Group Radio Access Network; Evolved Universal Terrestrial Radio Access (E-UTRA); Physical channels and modulation (Release 12)," 3GPP TS 36.211 V12.6.0, Jun. 2015, 137 pages.

* cited by examiner (a) In-band system (b) Guard-band system (c) Stand-alone system

FIG. 26

CELL SEARCH METHOD IN WIRELESS COMMUNICATION SYSTEM AND APPARATUS THEREFOR

CROSS-REFERENCE TO RELATED APPLICATIONS

This application is a continuation of U.S. patent application Ser. No. 15/760,587, filed on Mar. 15, 2018, now U.S. Pat. No. 10,560,208, which is the National Stage filing under 35 U.S.C. 371 of International Application No. PCT/KR2016/010427, filed on Sep. 19, 2016, which claims the benefit of U.S. Provisional Application No. 62/219,067, filed on Sep. 15, 2015, 62/222,788, filed on Sep. 24, 2015, and 62/267,219, filed on Dec. 14, 2015, the contents of which are all hereby incorporated by reference herein in their entirety.

TECHNICAL FIELD

The present invention relates to a wireless communication system and, more particularly, to a method of performing cell search using a narrow band synchronization signal and an apparatus therefor.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed service, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

An object of the present invention is to propose a pattern and/or method in which a synchronization signal that may be used for a narrow band LTE system characteristic and object is mapped to a wireless resource in a narrow band LTE system.

Technical objects to be achieved by the present invention are not limited to the aforementioned technical objects, and other technical objects not described above may be evidently understood by a person having ordinary skill in the art to which the present invention pertains from the following description.

Technical Solution

In an aspect of the present invention, a cell search method of a UE in a wireless communication system includes the steps of receiving a narrow band synchronization signal (NBSS) through a narrow band (NB) from an eNB; obtaining, based on the narrow band synchronization signal, time synchronization and frequency synchronization with the eNB and detecting an identifier of an eNB, wherein the NB may have 180 kHz system bandwidth and 12 carriers spaced with 15 kHz, the NBSS may include a narrow band primary synchronization signal (NBPSS) and a narrow band secondary synchronization signal (NBSSS), the NBPSS may be transmitted in a sixth subframe of a radio frame, and the NBSSS may be transmitted in a tenth subframe of the radio frame.

Furthermore, the NBSS may not be transmitted in at least one symbol in which a reference signal (RS) is transmitted among symbols of the sixth subframe and tenth subframe.

Furthermore, the sixth subframe and the tenth subframe may be subframes not configured as a multicast broadcast single frequency network (MBSFN) subframe.

Furthermore, a transmission periods of the NBPSS and a transmission period of the NBSSS may be differently configured.

Furthermore, the transmission period of the NBPSS may be set to 10 ms, and the transmission period of the NBSSS may be set to 20 ms.

Furthermore, the NBSS may be generated using a Zadoff-Chu (ZC) sequence.

Furthermore, the NBSS may be transmitted through eleven orthogonal frequency-division multiple access (OFDMA) symbols.

Furthermore, the NBSSS may be transmitted through the 12 subcarriers in the tenth subframe.

Furthermore, the UE may operate in an in-band system.

Furthermore, in another aspect of the present invention, a UE performing cell search in a wireless communication system includes a radio frequency (RF) unit configured to transmit and receive a radio signal and a processor configured to control the RF unit. The processor may be configured to receive a narrow band synchronization signal (NBSS) through a narrow band (NB) from an eNB, may obtain, based on the narrow band synchronization signal, time synchronization and frequency synchronization with the eNB, and detect an identifier of an eNB, wherein the NB may have 180 system bandwidth and 12 carriers spaced with 15 kHz, the NBSS may include a narrow band primary synchronization signal (NBPSS) and a narrow band secondary synchronization signal (NBSSS), the NBPSS may be transmitted in a sixth subframe of a radio frame, and the NBSSS may be transmitted in a tenth subframe of the radio frame.

Furthermore, the NBSS may not be transmitted in at least one symbol in which a reference signal (RS) is transmitted among symbols of the sixth subframe and tenth subframe.

Furthermore, the sixth subframe and the tenth subframe may be subframes not configured as a multicast broadcast single frequency network (MBSFN) subframe.

Furthermore, a transmission period of the NBPSS may be set to 10 ms, and a transmission period of the NBSSS may be set to 20 ms.

Furthermore, the NBSS may be transmitted through eleven OFDM symbols.

Furthermore, the NBSSS may be transmitted through 12 subcarriers in the tenth subframe.

Advantageous Effects

In accordance with an embodiment of the present invention, a collision between a synchronization signal in a narrow band system and a PMCH transmitted through an MBSFN subframe in a legacy LTE system can be prevented because a narrow band synchronization signal is transmitted in a subframe not configured as an MBSFN subframe.

Furthermore, in accordance with an embodiment of the present invention, an impact on the legacy system attributable to the introduction of a narrow band synchronization signal can be minimized because the narrow band synchronization signal is configured to be not mapped to an OFDM symbol in which a control channel, such as a PDCCH, is transmitted or an OFDM symbol in which a CRS is transmitted.

Furthermore, in accordance with an embodiment of the present invention, there is an advantage in that the largest number of combinations/configurations of combinations/configurations in which uplink-downlink transmission has been previously defined for each subframe is satisfied because a narrow band synchronization signal is downlink-transmitted in the sixth subframe and tenth subframe of a radio frame.

Furthermore, in accordance with an embodiment of the present invention, there is an effect in that a UE can determine/decode a narrow band synchronization signal more accurately because a narrow band synchronization signal is transmitted using all of the remaining eleven OFDM symbols other than an OFDM symbol used for reference signal or control channel transmission.

Advantages which may be obtained by the present invention are not limited to the aforementioned advantages, and various other advantages may be evidently understood by those skilled in the art to which the present invention pertains from the following description.

DESCRIPTION OF DRAWINGS

The accompanying drawings, which are included herein as a part of a description in order to help understanding of the present invention, provide embodiments of the present invention, and describe the technical features of the present invention with the description below.

FIG. 26 is a diagram showing a method of transmitting an M-PSS (or M-SSS) sequence if an extended CP has been applied in accordance with a fifth embodiment of the present invention.

BEST MODE

Figure 1:
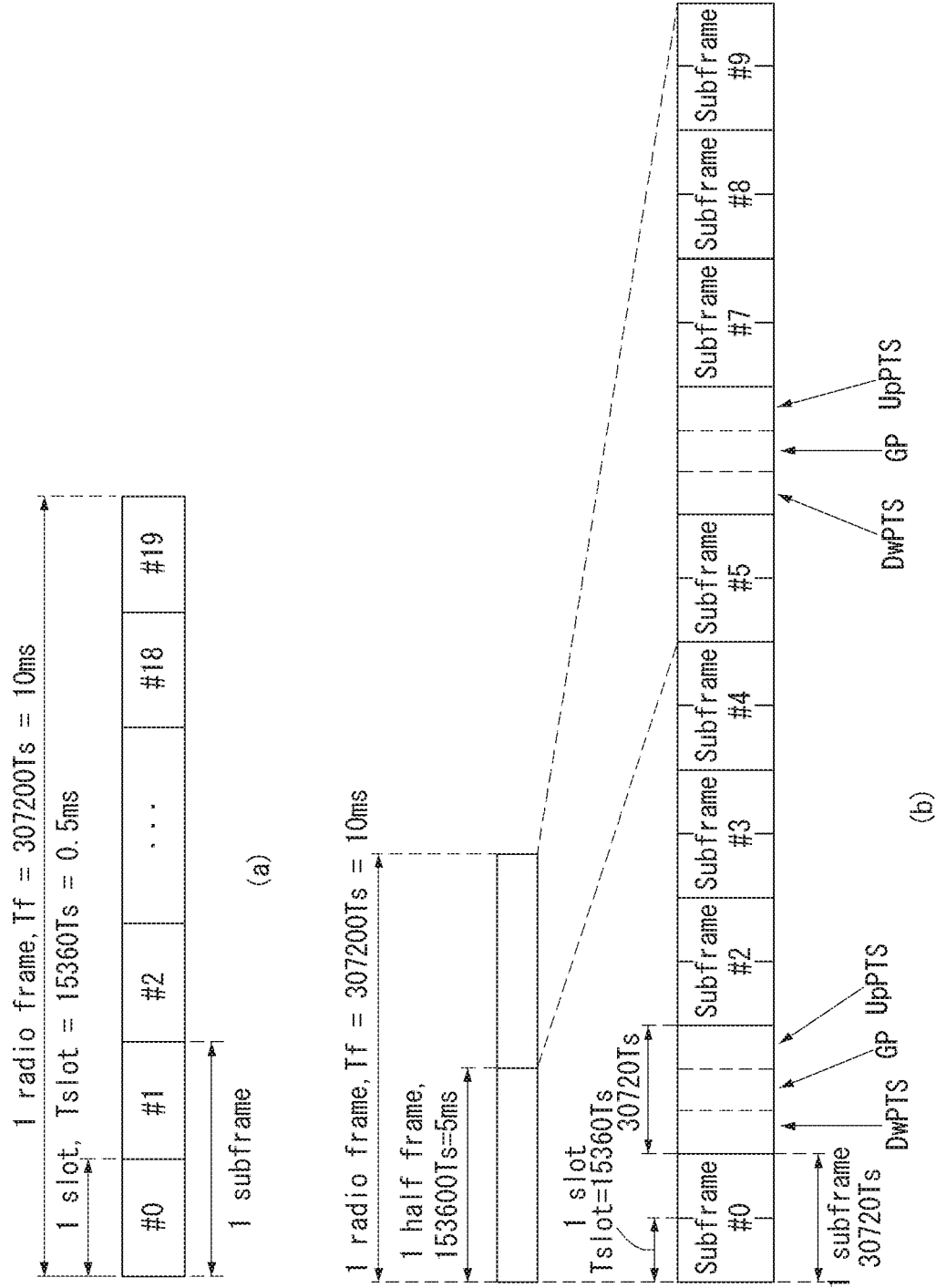
FIG. 1 illustrates the structure of a radio frame in a wireless communication system to which an embodiment of the present invention may be applied.

Some embodiments of the present invention are described in detail with reference to the accompanying drawings. A detailed description to be disclosed along with the accompanying drawings is intended to describe some exemplary embodiments of the present invention and is not intended to describe a sole embodiment of the present invention. The following detailed description includes more details in order to provide full understanding of the present invention. However, those skilled in the art will understand that the present invention may be implemented without such more details.

In some cases, in order to avoid making the concept of the present invention vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a base transceiver system (BTS), or an access point (AP). Furthermore, the device may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to which an Embodiment of the Present Invention May be Applied

FIG. 1 shows the structure of a radio frame in a wireless communication system to which an embodiment of the present invention may be applied.

3GPP LTE/LTE-A support a radio frame structure type 1 which may be applicable to frequency division duplex (FDD) and a radio frame structure which may be applicable to time division duplex (TDD).

In FIG. 1, the size of the radio frame in a time domain is represented as a multiple of a time unit of $T\_s=1/(15000*2048)$. Downlink and uplink transmission includes a radio frame having a period of $T\_f=307200*T\_s=10$ ms.

FIG. 1(a) illustrates the structure of a type 1 radio frame. The type 1 radio frame may be applied to both full duplex and half duplex FDD.

The radio frame includes 10 subframes. One radio frame includes 20 slots of $T\_slot=15360*T\_s=0.5$ ms in length. 0 to 19 indices are assigned to the respective slots. One subframe includes consecutive 2 slots in the time domain, and a subframe i includes a slot $2i$ and a slot $2i+1$. The time taken to send one subframe is called a transmission time period (TTI). For example, the length of one subframe may be 1 ms, and the length of one slot may be 0.5 ms.

In FDD, uplink transmission and downlink transmission are divided in a frequency domain. There is no limit to full duplex FDD, whereas UE cannot send and receive data at the same time in a half duplex FDD operation.

One slot includes a plurality of orthogonal frequency division multiplexing (OFDM) symbols in the time domain and includes a plurality of resource blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of consecutive subcarriers in one slot.

FIG. 1(b) shows a frame structure type 2.

The frame structure type 2 includes two half frames, each having a length of 153600*T_s=5 ms. Each half frame includes 5 subframes, each having a length of 30720*T_s=1 ms.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, "D" indicates a subframe for downlink transmission, "U" indicates a subframe for uplink transmission, and "S" indicates a special subframe including three types of fields, including a downlink pilot time slot (DwPTS), a guard period (GP), and an uplink pilot time slot (UpPTS).

The DwPTS is used for initial cell search, synchronization or channel estimation in UE. The UpPTS is used for synchronization of uplink transmission for UE and channel estimation in an eNB. The GP is a period for removing interference generated in uplink due to multi-path delay of a downlink signal between uplink and downlink.

Each subframe i includes a slot 2i and a slot 2i+1, each having T_slot=15360*T_s=0.5 ms length.

An uplink-downlink configuration may be classified into 7 types. The positions and/or number of downlink subframes, special subframes, and uplink subframe are different in each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a physical downlink control channel (PDCCH) like other scheduling information. Configuration information may be transmitted to all pieces of UE within a cell through a broadcast channel as broadcasting information.

Table 2 shows the configuration (the length of a DwPTS/GP/UpPTS) of a special subframe.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

The structure of the radio frame according to the example of FIG. 1 is only an example. The number of subcarriers included in a radio frame or the number of slots included in a subframe and the number of OFDM symbols included in a slot may be changed in various ways.

Figure 2:
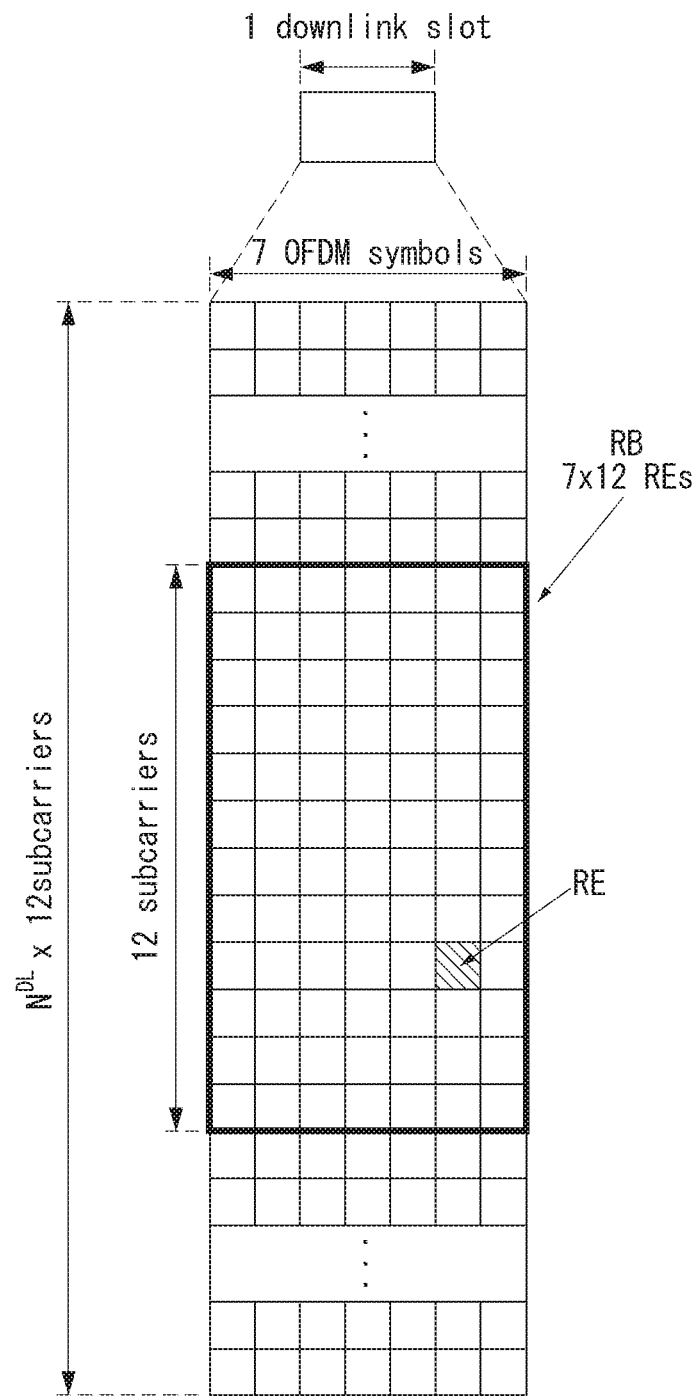
FIG. 2 is a diagram illustrating a resource grid for a downlink slot in a wireless communication system to which an embodiment of the present invention may be applied.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs N^DL included in a downlink slot depends on a downlink transmission bandwidth.

The structure of an uplink slot may be the same as that of a downlink slot.

Figure 3:
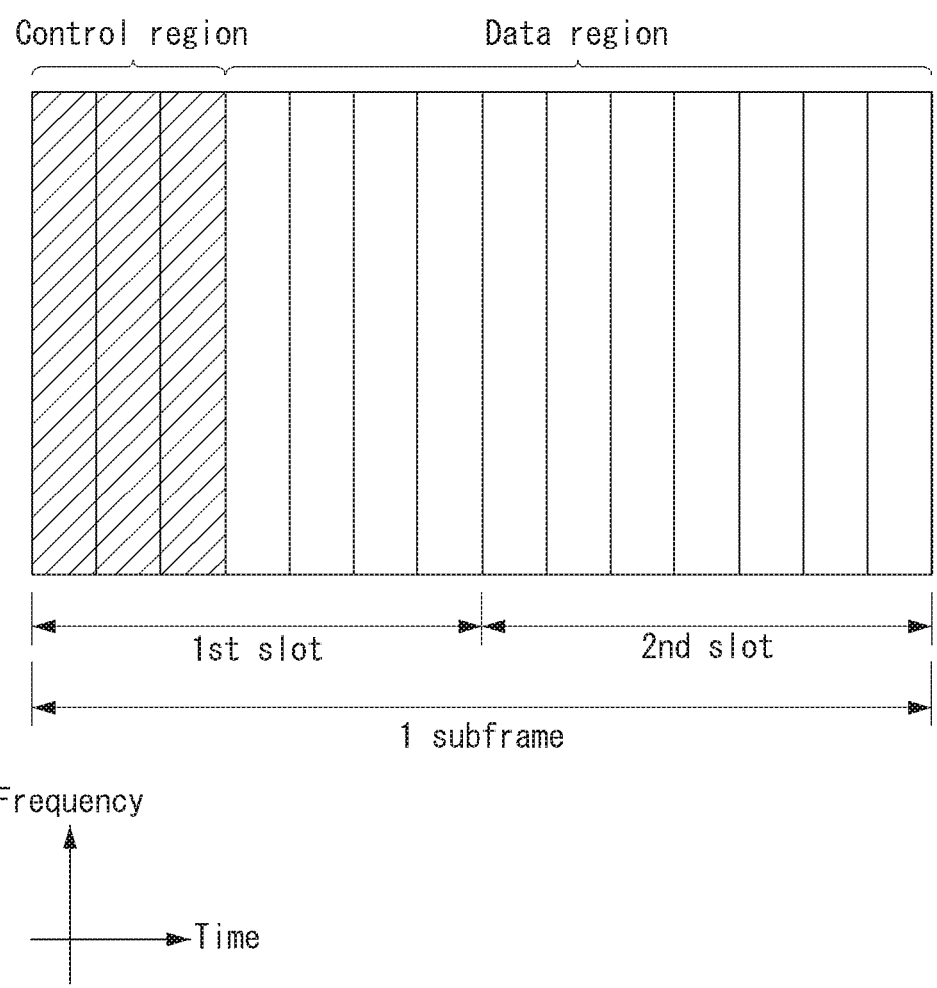
FIG. 3 illustrates the structure of a downlink subframe in a wireless communication system to which an embodiment of the present invention may be applied.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARD). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some consecutive CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches cyclic redundancy check (CRC) to control information. A unique identifier (a radio network temporary identifier (RNTI)) is masked to the CRC depending on the owner or use of a PDCCH. If the PDCCH is a PDCCH for specific UE, an identifier unique to the UE, for example, a cell-RNTI (C-RNTI) may be masked to the CRC. If the PDCCH is a PDCCH for a paging message, a paging indication identifier, for example, a paging-RNTI (P-RNTI) may be masked to the CRC. If the PDCCH is a PDCCH for system information, more specifically, a system information block (SIB), a system information identifier, for example, a system information-RNTI (SI-RNTI) may be masked to the CRC. A random access-RNTI (RA-RNTI) may be masked to the CRC in order to indicate a random access response which is a response to the transmission of a random access preamble by UE.

Figure 4:
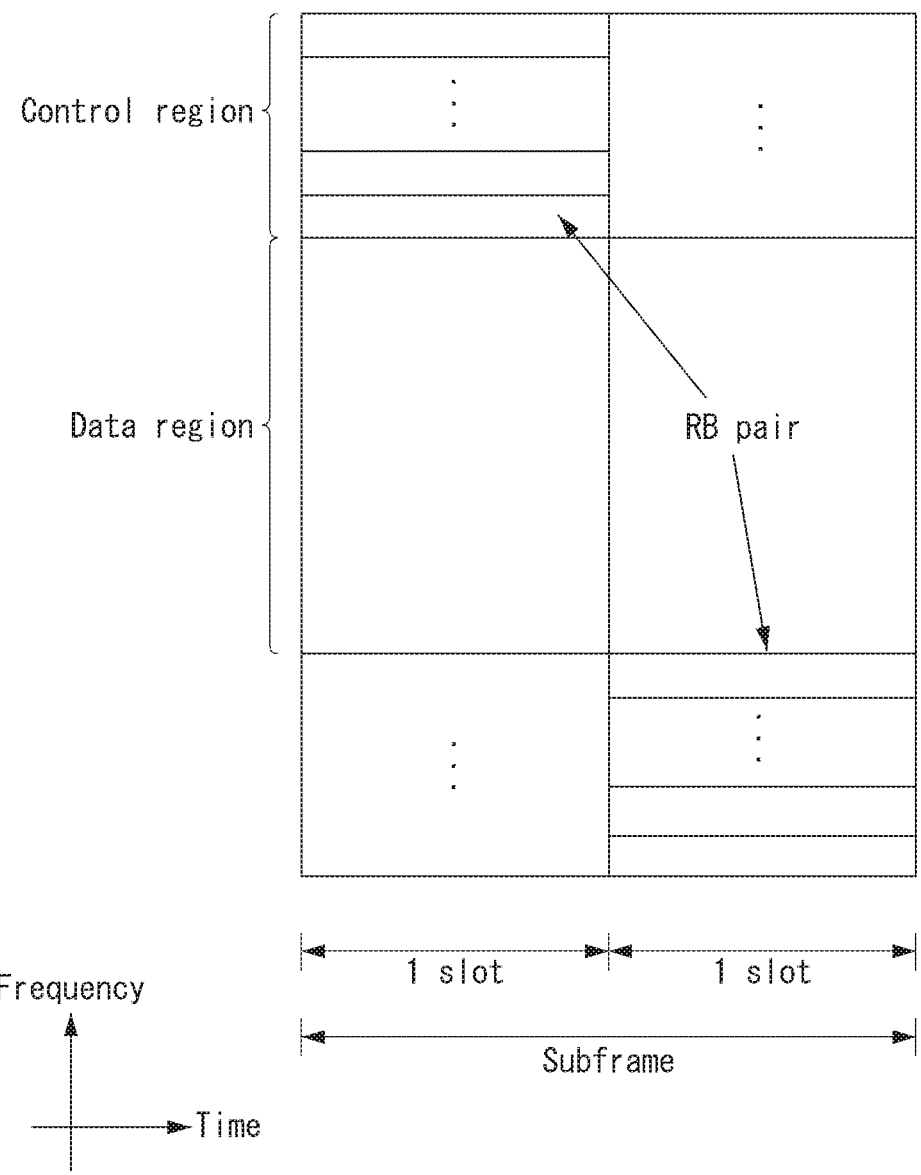
FIG. 4 illustrates the structure of an uplink subframe in a wireless communication system to which an embodiment of the present invention may be applied.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A resource block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Multi-Input Multi-Output (MIMO)

A MIMO technology does not use single transmission antenna and single reception antenna that have been commonly used so far, but uses a multi-transmission (Tx) antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna."

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

The multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

Figure 5:
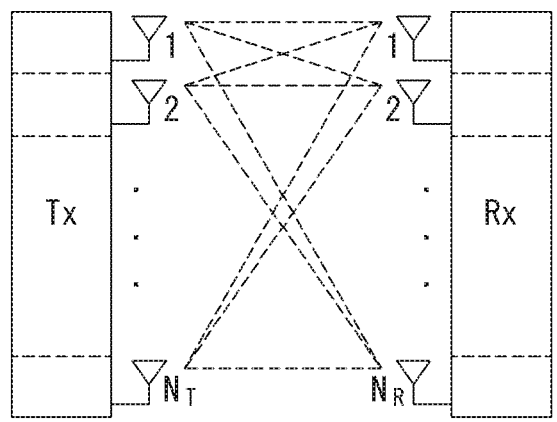
FIG. 5 shows the configuration of a known MIMO communication system.

FIG. 5 shows the configuration of a known MIMO communication system.

Referring to FIG. 5, if the number of transmission (Tx) antennas is increased to N_T and the number of reception (Rx) antennas is increased to N_R at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment R_i by a maximum transfer rate R_o if one antenna is used.

$$R_i = \min(N_T, N_R) \qquad \text{[Equation 1]}$$

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas. Furthermore, active research is being recently carried out on a method for properly obtaining the advantages of the two methods by combining the two methods.

Each of the methods is described in more detail below.

First, the spatial diversity method includes a space-time block code-series method and a space-time Trelis code-series method using a diversity gain and a coding gain at the same time. In general, the Trelis code-series method is better in terms of bit error rate improvement performance and the degree of a code generation freedom, whereas the space-time block code-series method has low operational complexity. Such a spatial diversity gain may correspond to an amount corresponding to the product (N_T×N_R) of the number of transmission antennas (N_T) and the number of reception antennas (N_R).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case, may include a maximum likelihood detection (MLD) receiver, a zero-forcing (ZF) receiver, a minimum mean square error (MMSE) receiver, diagonal-bell laboratories layered space-time (D-BLAST), and vertical-bell laboratories layered space-time (V-BLAST). In particular, if a transmission end can be aware of channel information, a singular value decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-STTD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 5, it is assumed that N_T transmission antennas and N_R reception antennas are present.

First, a transmission signal is described below. If the N_T transmission antennas are present as described above, a maximum number of pieces of information which can be transmitted are N_T, which may be represented using the following vector.

$$s=[s_1,s_2,\ldots,s_{N_T}]^T \quad \text{[Equation 2]}$$

Transmission power may be different in each of pieces of transmission information s_1, s_2, ..., s_NT. In this case, if pieces of transmission power are P_1, P_2, ..., P_NT, transmission information having controlled transmission power may be represented using the following vector.

$$\hat{s}=[\hat{s}_1,\hat{s}_2,\ldots,\hat{s}_{N_T}]^T=[P_1 s_1, P_2 s_2,\ldots,P_{N_T} s_{N_T}]^T \quad \text{[Equation 3]}$$

In Equation 3, transmission information having controlled transmission power may be represented as follows using the diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

The information vector having controlled transmission power in Equation 4 is multiplied by a weight matrix W, thus forming N_T transmission signals x_1, x_2, ..., x_NT that are actually transmitted. In this case, the weight matrix functions to properly distribute the transmission information to antennas according to a transport channel condition. The following may be represented using the transmission signals x_1, x_2, ..., x_NT.

$$x = \begin{bmatrix} x_1 \\ x_2 \\ \vdots \\ x_i \\ \vdots \\ x_{N_T} \end{bmatrix}$$

$$= \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s} = WPs$$

[Equation 5]

In Equation 5, w_ij denotes weight between an i-th transmission antenna and a j-th transmission information, and W is an expression of a matrix of the weight. Such a matrix W is called a weight matrix or precoding matrix.

The transmission signal x, such as that described above, may be taken into consideration to be used in the case where a spatial diversity is used and a case where spatial multiplexing is used.

If spatial multiplexing is used, all the elements of the information vector s have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If N_R reception antennas are present, the reception signals y_1, y_2, ..., y_NR of the respective antennas are represented as follows using a vector y.

$$y=[y_1,y_2,\ldots,y_{N_R}]^T \quad \text{[Equation 6]}$$

Meanwhile, if channels in a multi-input/output antenna communication system are modeled, the channels may be classified according to transmission/reception antenna indices. A channel passing through a reception antenna i from a transmission antenna j is represented as h_ij. In this case, it is to be noted that in order of the index of h_ij, the index of a reception antenna comes first and the index of a transmission antenna then comes.

Several channels may be grouped and expressed in a vector and matrix form. For example, a vector expression is described below.

Figure 6:
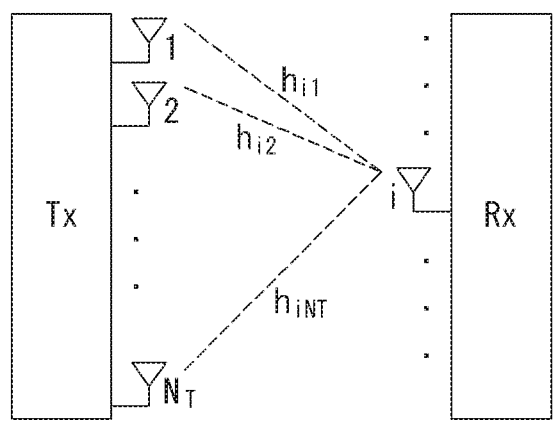
FIG. 6 is a diagram showing a channel from a plurality of transmission antennas to a single reception antenna.

FIG. 6 is a diagram showing a channel from a plurality of transmission antennas to a single reception antenna.

As shown in FIG. 6, a channel from a total of N_T transmission antennas to a reception antenna i may be represented as follows.

$$h_i^T = [h_{i1}, h_{i2}, \ldots, h_{iN_T}] \quad \text{[Equation 6]}$$

Furthermore, if all channels from the N_T transmission antenna to N_R reception antennas are represented through a matrix expression, such as Equation 7, they may be represented as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \quad \text{[Equation 8]}$$

Additive white Gaussian noise (AWGN) is added to an actual channel after the actual channel experiences the channel matrix H. Accordingly, AWGN n_1, n_2, ..., n_NR added to the N_R reception antennas, respectively, are represented using a vector as follows.

$$n = [n_1, n_2, \ldots, n_{N_R}]^T \quad \text{[Equation 9]}$$

A transmission signal, a reception signal, a channel, and AWGN in a multi-input/output antenna communication system may be represented to have the following relationship through the modeling of the transmission signal, reception signal, channel, and AWGN, such as those described above.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_j \\ \vdots \\ n_{N_R} \end{bmatrix} = \quad \text{[Equation 10]}$$

$$Hx + n$$

The number of rows and columns of the channel matrix H indicative of the state of channels is determined by the number of transmission/reception antennas. In the channel matrix H, as described above, the number of rows becomes equal to the number of reception antennas N_R, and the number of columns becomes equal to the number of transmission antennas N_T. That is, the channel matrix H becomes an N_R×N_T matrix.

In general, the rank of a matrix is defined as a minimum number of the number of independent rows or columns. Accordingly, the rank of the matrix is not greater than the number of rows or columns. As for figural style, for example, the rank H of the channel matrix H is limited as follows.

$$\text{rank}(H) \leq \min(N_T, N_R) \quad \text{[Equation 11]}$$

Furthermore, if a matrix is subjected to Eigen value decomposition, a rank may be defined as the number of Eigen values that belong to Eigen values and that are not 0. Likewise, if a rank is subjected to singular value decomposition (SVD), it may be defined as the number of singular values other than 0. Accordingly, the physical meaning of a rank in a channel matrix may be said to be a maximum number on which different information may be transmitted in a given channel.

In this specification, a "rank" for MIMO transmission indicates the number of paths through which signals may be independently transmitted at a specific point of time and a specific frequency resource. The "number of layers" indicates the number of signal streams transmitted through each path. In general, a rank has the same meaning as the number of layers unless otherwise described because a transmission end sends the number of layers corresponding to the number of ranks used in signal transmission.

General Carrier Aggregation

A communication environment taken into consideration in embodiments of the present invention includes a multi-carrier support environment. That is, a multi-carrier system or carrier aggregation (CA) system that is used in an embodiment of the present invention refers to a system in which one or more Component Carriers (CCs) having a smaller bandwidth than a target bandwidth are aggregated and used when the target wideband is configured in order to support a wideband.

In an embodiment of the present invention, a multi-carrier means of an aggregation of carriers (or a carrier aggregation). In this case, an aggregation of carriers means both an aggregation between consecutive carriers and an aggregation between inconsecutive (or non-contiguous) carriers. Furthermore, the number of CCs aggregated between downlink and uplink may be different. A case where the number of downlink CCs (hereinafter called "DL CCs") and the number of uplink CCs (hereinafter called "UL CCs") are the same is called a symmetric aggregation. A case where the number of DL CCs is different from the number of UL CCs is called an asymmetric aggregation. Such the term of a carrier aggregation may be replaced with terms, such as a carrier aggregation, bandwidth aggregation, or spectrum aggregation.

An object of a carrier aggregation configured by aggregating two or more component carriers is to support up to a 100 MHz bandwidth in an LTE-A system. When one or more carriers having a smaller bandwidth than a target bandwidth are aggregated, the bandwidth of the aggregated carriers may be restricted to a bandwidth which is used in an existing system in order to maintain backward compatibility with an existing IMT system. For example, in an existing 3GPP LTE system, {1.4, 3, 5, 10, 15, 20} MHz bandwidths may be supported. In a 3GPP LTE-advanced system (i.e., LTE-A), bandwidths greater than the bandwidth 20 MHz may be supported using only the bandwidths for a backward compatibility with existing systems. Furthermore, in a carrier aggregation system used in an embodiment of the present invention, new bandwidths may be defined regardless of the bandwidths used in the existing systems in order to support a carrier aggregation.

An LTE-A system uses the concept of a cell in order to manage radio resources.

The aforementioned carrier aggregation environment may also be called a multi-cell environment. A cell is defined as a combination of a pair of a downlink resource (DL CC) and an uplink resource (UL CC), but an uplink resource is not an essential element. Accordingly, a cell may consist of a downlink resource only or a downlink resource and an uplink resource. If specific UE has a single configured serving cell, it may have 1 DL CC and 1 UL CC. If specific UE has two or more configured serving cells, it has DL CCs corresponding to the number of cells, and the number of UL CCs may be the same as or smaller than the number of DL CCs.

In some embodiments, a DL CC and an UL CC may be configured in an opposite way. That is, if specific UE has a plurality of configured serving cells, a carrier aggregation environment in which the number of UL CCs is greater than the number of DL CCs may also be supported. That is, a carrier aggregation may be understood as being an aggregation of two or more cells having different carrier frequency (the center frequency of a cell). In this case, the "cell" should be distinguished from a "cell", that is, a region commonly covered by an eNB.

A cell used in an LTE-A system includes a primary cell (PCell) and a secondary cell (SCell). A PCell and an SCell may be used as serving cells. In the case of UE which is in an RRC_CONNECTED state, but in which a carrier aggregation has not been configured or which does not support a carrier aggregation, only one serving cell configured as only a PCell is present. In contrast, in the case of UE which is in the RRC_CONNECTED state and in which a carrier aggregation has been configured, one or more serving cells may be present. A PCell and one or more SCells are included in each serving cell.

A serving cell (PCell and SCell) may be configured through an RRC parameter. PhysCellId is the physical layer identifier of a cell and has an integer value from 0 to 503. SCellIndex is a short identifier which is used to identify an SCell and has an integer value of 1 to 7. ServCellIndex is a short identifier which is used to identify a serving cell (PCell or SCell) and has an integer value of 0 to 7. The value 0 is applied to a PCell, and SCellIndex is previously assigned in order to apply it to an SCell. That is, in ServCellIndex, a cell having the smallest cell ID (or cell index) becomes a PCell.

A PCell means a cell operating on a primary frequency (or a primary CC). A PCell may be used for UE to perform an initial connection establishment process or a connection re-establishment process and may refer to a cell indicated in a handover process. Furthermore, a PCell means a cell that belongs to serving cells configured in a carrier aggregation environment and that becomes the center of control-related communication. That is, UE may receive a PUCCH allocated only in its PCell and send the PUCCH and may use only the PCell to obtain system information or to change a monitoring procedure. An evolved universal terrestrial radio access network (E-UTRAN) may change only a PCell for a handover procedure using the RRC connection reconfiguration (RRCConnectionReconfiguration) message of a higher layer including mobility control information (mobilityControlInfo) for UE which supports a carrier aggregation environment.

An SCell may mean a cell operating on a secondary frequency (or secondary CC). Only one PCell is allocated to specific UE, and one or more SCells may be allocated to the specific UE. An SCell may be configured after RRC connection is established and may be used to provide additional radio resources. A PUCCH is not present in the remaining cells, that is, SCells that belong to serving cells configured in a carrier aggregation environment and that do not include a PCell. When adding an SCell to UE supporting a carrier aggregation environment, an E-UTRAN may provide all types of system information related to the operation of a related cell in the RRC_CONNECTED state through a dedicated signal. A change of system information may be controlled by releasing and adding a related SCell. In this case, the RRC connection reconfiguration (RRCConnection-Reconfigutaion) message of a higher layer may be used. An E-UTRAN may send dedicated signaling having a different parameter for each UE instead of broadcasting within a related SCell.

After an initial security activation process is started, an E-UTRAN may configure a network including one or more SCells by adding to a PCell that is initially configured in a connection establishing process. In a carrier aggregation environment, a PCell and an SCell may operate respective component carriers. In the following embodiments, a primary component carrier (PCC) may be used as the same meaning as a PCell, and a secondary component carrier (SCC) may be used as the same meaning as an SCell.

Figure 7:
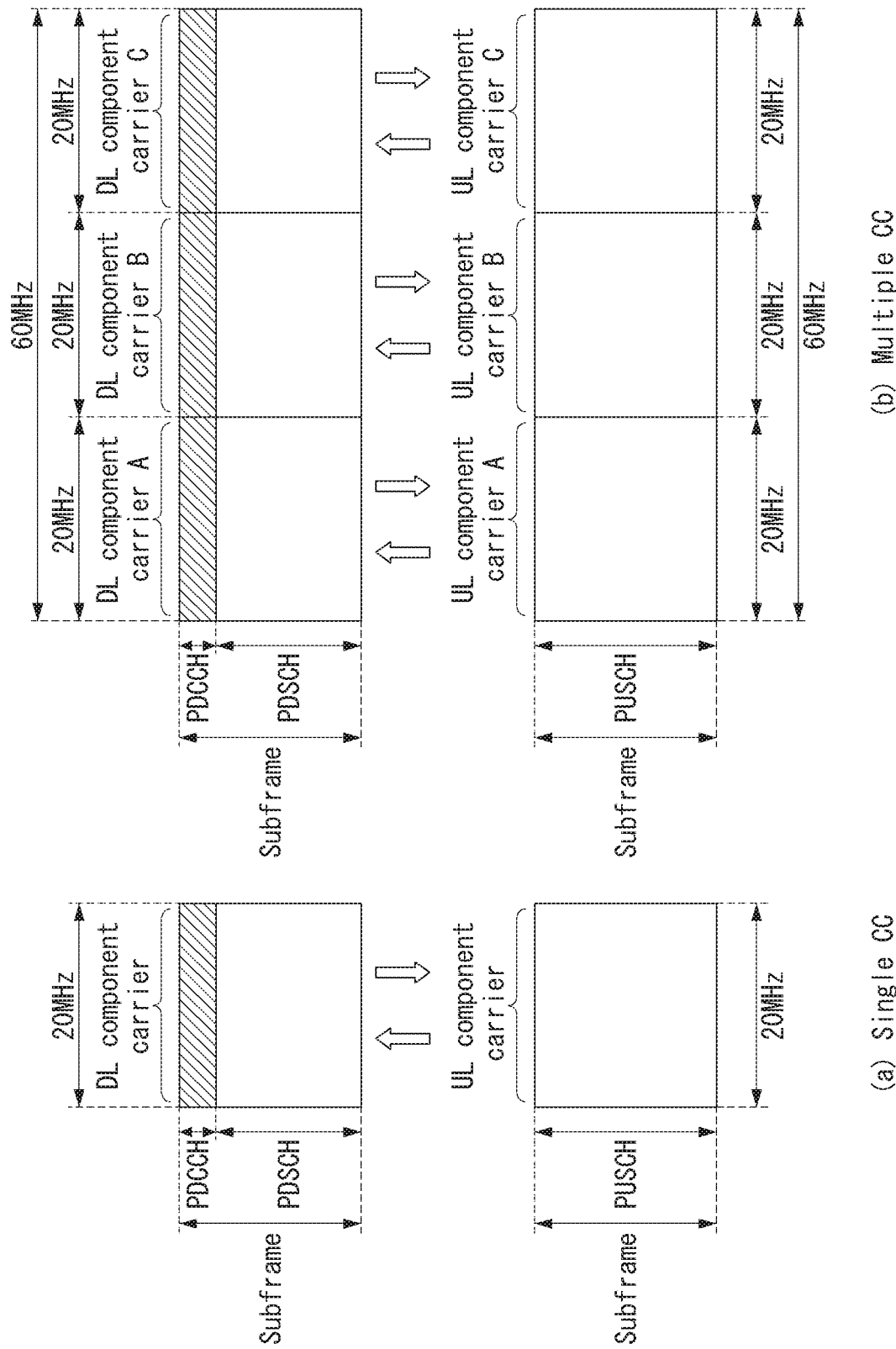
FIG. 7 shows an example of component carriers and a carrier aggregation in a wireless communication system to which an embodiment of the present invention may be applied.

FIG. 7 shows an example of component carriers and a carrier aggregation in a wireless communication system to which an embodiment of the present invention may be applied.

FIG. 7(a) shows the structure of a single carrier used in an LTE system. A CC includes a DL CC and an UL CC. One component carrier may have a frequency range of 20 MHz.

FIG. 7(b) shows the structure of a carrier aggregation used in an LTE-A system. FIG. 7(b) shows an example in which 3 component carriers each having a frequency size of 20 MHz have been aggregated. Three DL CCs and three UL CCs have been illustrated in FIG. 9, but the number of DL CCs and UL CCs is not limited. In the case of a carrier aggregation, UE may monitor 3 CCs at the same time, may receive downlink signal/data, and may transmit uplink signal/data.

If N DL CCs are managed in a specific cell, a network may allocate M (M≤N) DL CCs to UE. In this case, the UE may monitor only the M limited DL CCs and receive a DL signal. Furthermore, a network may give priority to L (L≤M≤N) DL CCs and allocate major DL CCs to the UE. In this case, the UE must monitor the L DL CCs. Such a method may be applied to uplink transmission in the same manner.

A linkage between a carrier frequency (or DL CC) of a downlink resource and a carrier frequency (or UL CC) of an uplink resource may be indicated by a higher layer message, such as an RRC message, or system information. For example, a combination of DL resources and UL resources may be configured by a linkage defined by system information block type2 (SIB2). Specifically, the linkage may mean a mapping relationship between a DL CC in which a PDCCH carrying an UL grant is transmitted and an UL CC in which the UL grant is used and may mean a mapping relationship between a DL CC (or UL CC) in which data for an HARQ is transmitted and an UL CC (or DL CC) in which an HARQ ACK/NACK signal is transmitted.

Figure 8:
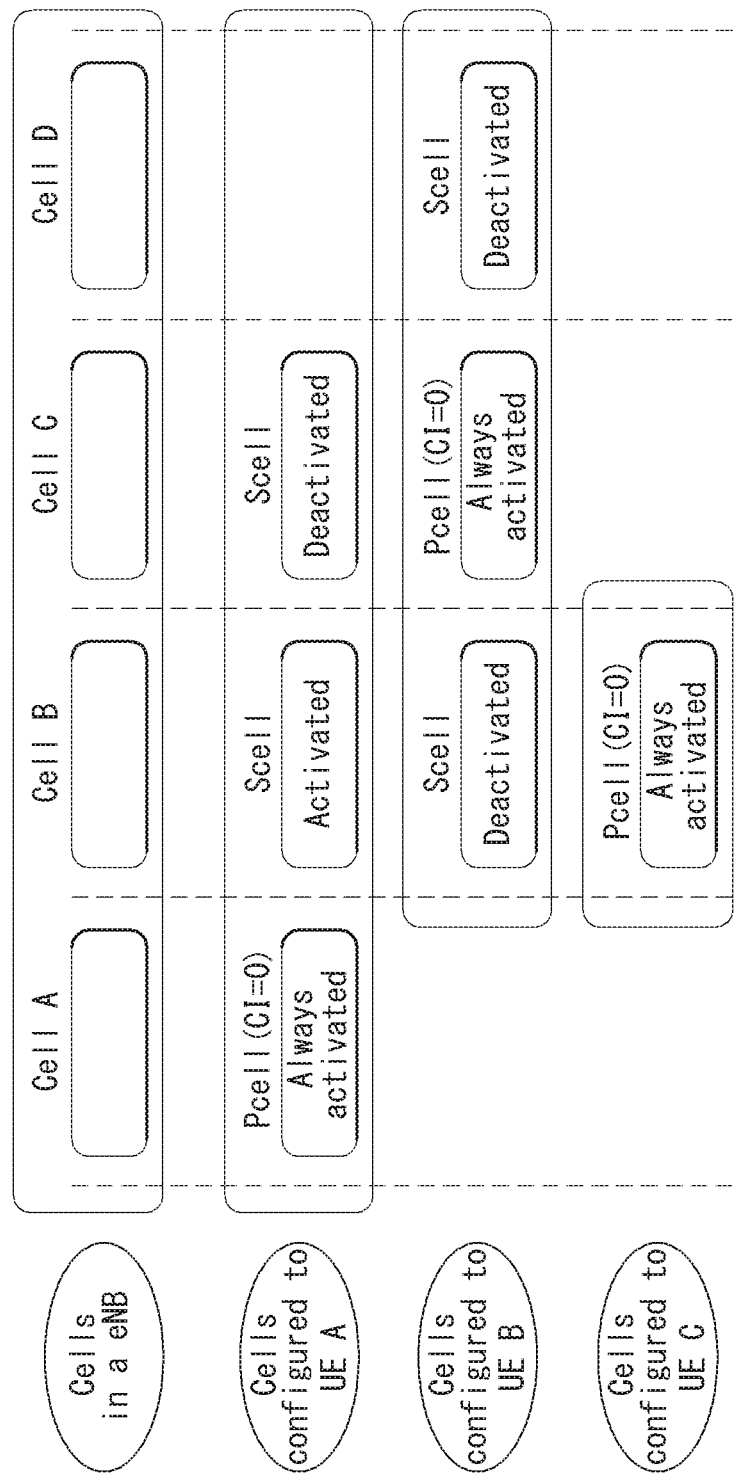
FIG. 8 is a diagram showing the classification of cells of a system supporting a carrier aggregation.

FIG. 8 is a diagram showing the classification of cells of a system supporting a carrier aggregation.

Referring to FIG. 8, a configured cell is a cell that belongs to cells of an eNB and that may be subjected to a carrier aggregation based on a measurement report as in FIG. 7, and may be configured for each UE. In the configured cell, resources for ACK/NACK transmission for PDSCH transmission may have been previously reserved. An activated cell is a cell that belongs to configured cells and that is configured to actually transmit a PDSCH/PUSCH, and performs channel state information (CSI) report for PDSCH/PUSCH transmission and sounding reference signal (SRS) transmission. A deactivated cell is a cell configured to not perform PDSCH/PUSCH transmission in response to a command from an eNB or a timer operation, and may stop CSI report and SRS transmission.

Synchronization Signal/Sequence (SS)

An SS includes a primary (P)-SS and a secondary (S)-SS, and corresponds to a signal used upon performing the cell search.

Figure 9:
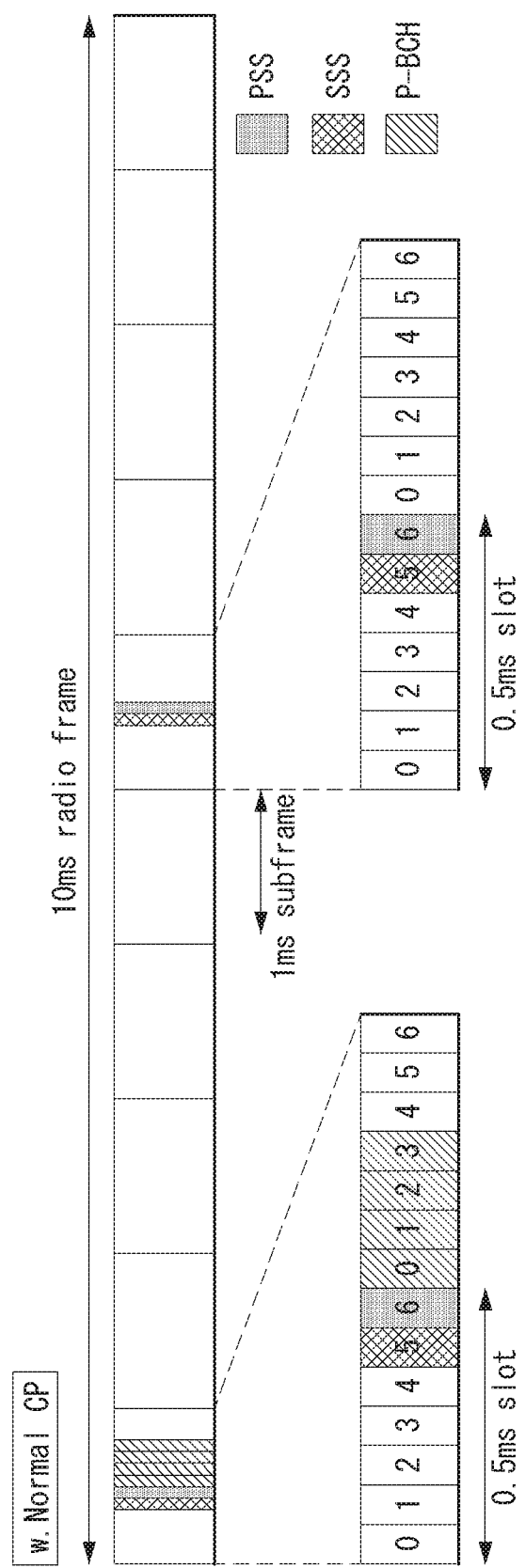
FIG. 9 is a diagram showing a frame structure used for SS transmission in a system using a normal cyclic prefix (CP).
Figure 10:
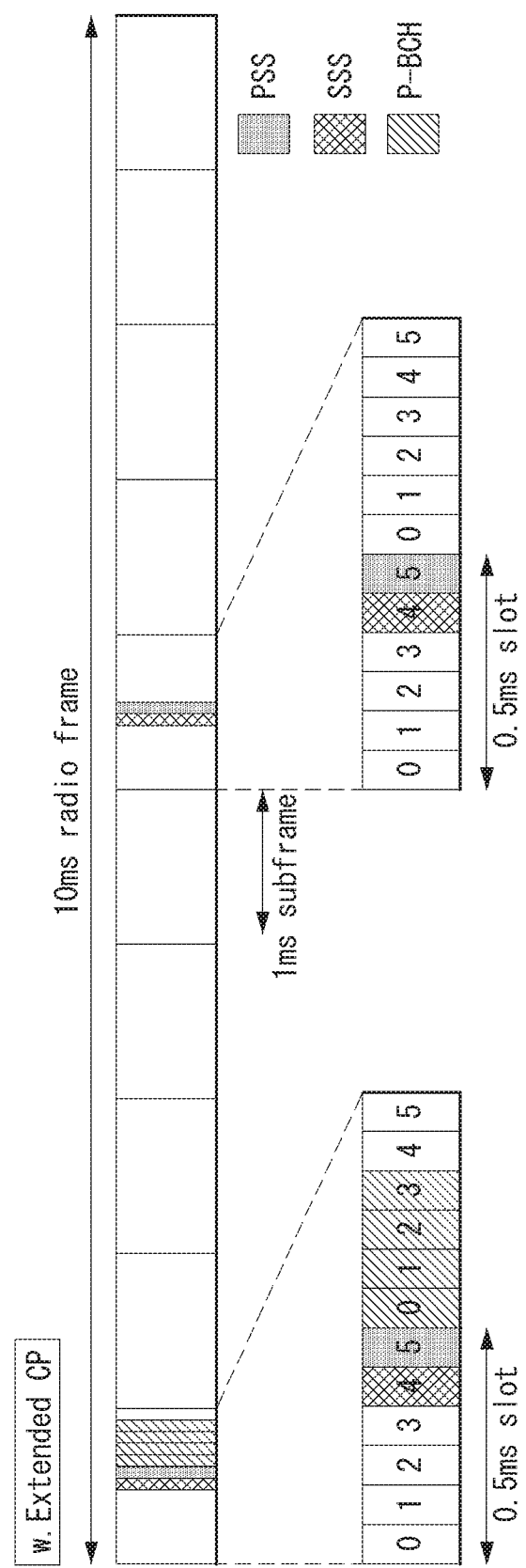
FIG. 10 is a diagram showing a frame structure used for SS transmission in a system using an extended CP.

FIG. 9 is a diagram showing a frame structure used for SS transmission in a system using a normal cyclic prefix (CP). FIG. 10 is a diagram showing a frame structure used for SS transmission in a system using an extended CP.

An SS is transmitted in the second slots of a subframe No. 0 and subframe No. 5 by taking into consideration 4.6 ms, that is, the frame length of a global system for mobile communications (GSM), for the easiness of inter-radio access technology (TAT) measurement. A boundary for the corresponding radio frame may be detected through an S-SS. A P-SS is transmitted in the last OFDM symbol of a corresponding slot, and an S-SS is transmitted in an OFDM symbol right before the P-SS.

An SS may transmit a total of 504 physical layer cell IDs through three P-SSs and 168 S-SS combinations. Furthermore, the SS and a PBCH are transmitted within 6 RBs in the middle of a system bandwidth so that a UE can detect or decode them regardless of a transmission bandwidth.

In a transmit diversity method of an SS, only one antenna port is used and the method is not separately defined in the standard. That is, in the transmit diversity method of an SS, single antenna transmission or a transmission method (e.g., precoder vector switching (PVS), time-switched transmit diversity (TSTD) and cyclic-delay diversity (CDD)) transparent to a UE may be used.

1. P-SS Code

A Zadoff-Chu (ZC) sequence of a length 63 is defined in a frequency domain and may be used as the sequence of a P-SS. The ZC sequence is defined by Equation 12, and a sequence element n=31 corresponding to a DC subcarrier is punctured. In Equation 12, N_zc=63.

$$d_u(n) = e^{-j\frac{\pi u n(n+1)}{N_{ZC}}}$$ [Equation 12]

The remaining nine subcarriers of 6 RBs (=7 subcarriers) located in the middle of a frequency domain are always transmitted as a value of 0, and facilitate a filter design for performing synchronization. In order to define a total of three P-SSs, in Equation 12, values of u=25, 29 and 34 may be used. In this case, 29 and 34 have a conjugate symmetry relation, and thus two correlations may be performed at the same time. In this case, the conjugate symmetry means Equation 13. A one-shot correlator for u=29 and 34 can be implemented using such a characteristic, thereby being capable of reducing a total computational load by about 33.3%.

$$d_u(n) = (-1)^n(d_{N_{ZC}-u}(n))^*, \text{ when } N_{ZC} \text{ is even number.}$$

$$d_u(n) = (d_{N_{ZC}-u}(n))^*, \text{ when } N_{ZC} \text{ is odd number.}$$ [Equation 13]

2. S-SS Code

In a sequence used for an S-SS, two m-sequences of a length 31 are interleaving-joined, and the two sequences are combined to transmit 168 cell group IDs. The m-sequence, that is, the sequence of the S-SS, is robust against a frequency selective environment and can reduce a computational load through fast m-sequence transform using Hadamard transform. Furthermore, to configure an S-SS using two short codes has been proposed to reduce a computational load of a UE.

Figure 11:
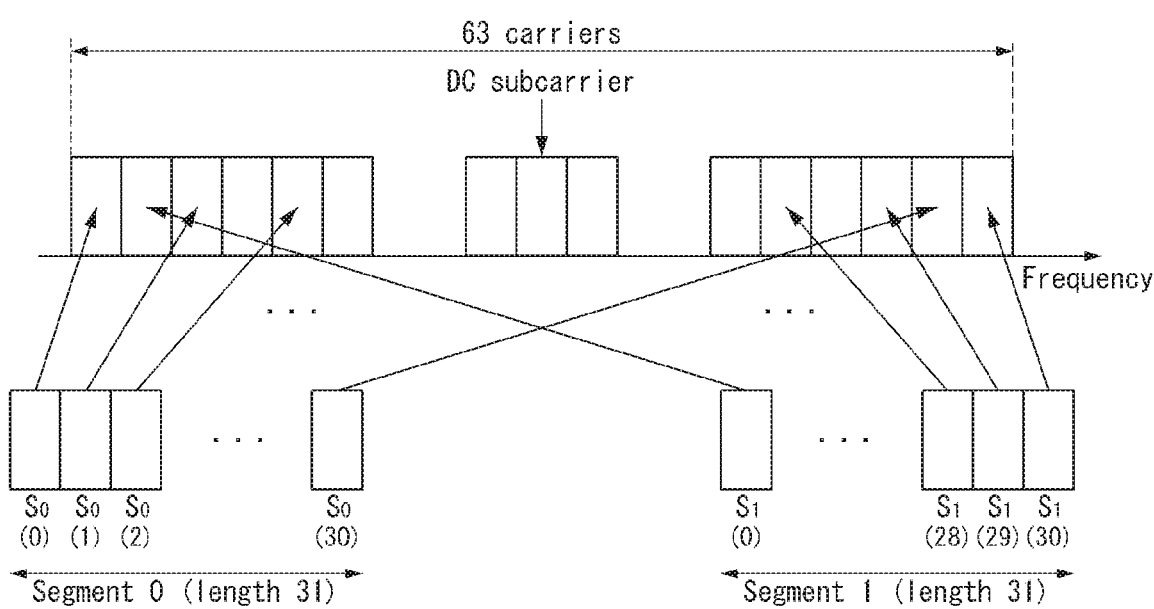
FIG. 11 is a diagram illustrating that two sequences in a logical region are interleaved and mapped in a physical region.

FIG. 11 is a diagram illustrating that two sequences in a logical region are interleaved and mapped in a physical region.

Referring to FIG. 11, assuming that two m-sequences used to generate an S-SS code are defined as an S1 and an S2, respectively, if the S-SS of a subframe 0 transmits a cell group ID through two combinations of (S1, S2), the S-SS of a subframe 5 is swapped into (S2, S1) and transmitted, thereby being capable of determining a 10-ms frame boundary. In this case, the S-SS code uses a generation polynomial of $x^5+x^2+1$, and a total of 31 codes may be generated through different circular shifts.

In order to improve reception performance, P-SS-based different two sequences are defined and scrambled to an S-SS. In this case, an S1 and an S2 may be scrambled in different sequences. Thereafter, an S1-based scrambling code is defined and scrambling may be performed on the S2. In this case, the code of the S-SS is exchanged in a 5 ms unit, but the P-SS-based scrambling code is not exchanged. The P-SS-based scrambling code is defined as a sixth-circular shift version according to a P-SS index in an m-sequence generated from the generation polynomial of $x^5+x^2+1$. The S1-based scrambling code is defined as an eight-circular shift version based on the index of the S1 in an m-sequence generated from a polynomial of $x^5+x^4+x^2+x^1+1$.

The following contents illustrate asynchronization criteria of an LTE system.

- a UE may monitor downlink link quality based on a cell-specific reference signal in order to detect downlink radio link quality of a PCell.
- a UE may estimate downlink radio link quality for the purpose of monitoring downlink radio link quality of a PCell and compare it with Q_out and Q_in, that is, thresholds.
- the threshold Q_out may be defined as a level in which a downlink radio link is not certainly received, and may correspond to a block error rate of 10% of PDCCH transmission of the hypothesis in which a PCFICH is taken into consideration along with transmission parameters.
- the threshold Q_in may be defined as a downlink radio link quality level in which a downlink radio link can be received more certainly compared to Q_out, and may correspond to a block error rate of 2% of PDCCH transmission in the hypothesis in which a PCFICH is taken into consideration along with transmission parameters.

Narrow Band (NB) LTE Cell Search

In NB-LTE, cell search may comply with the same rule as that in LTE, but another sequence design may be properly changed in order to improve the cell search ability.

Figure 12:
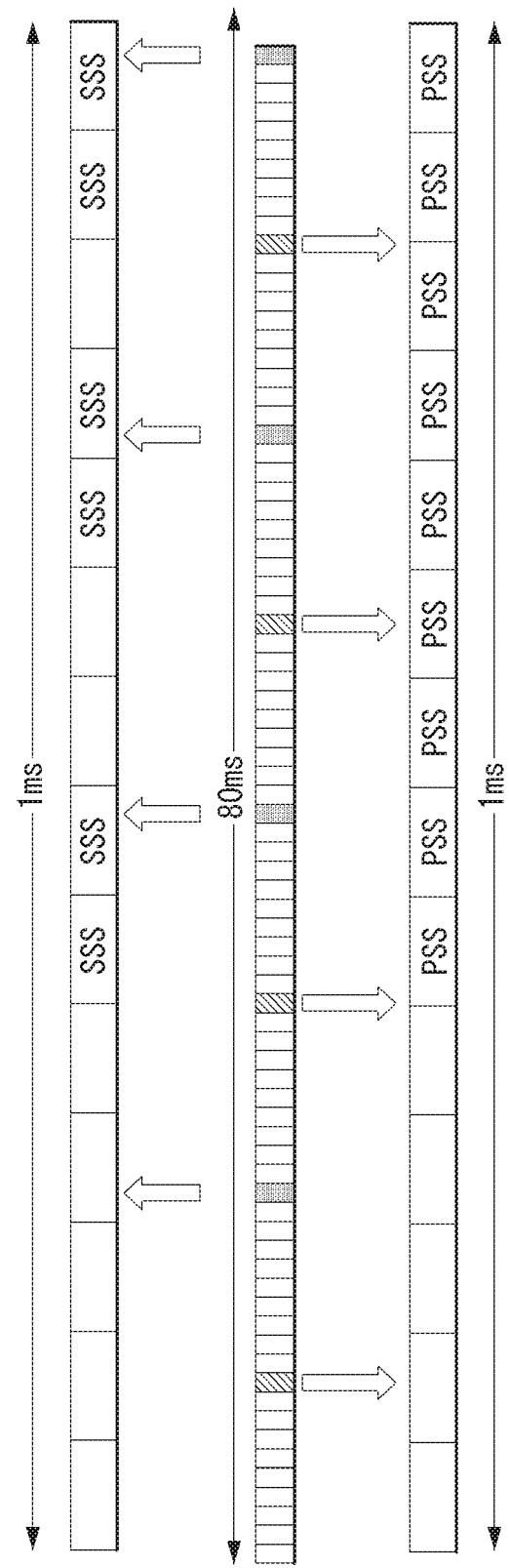
FIG. 12 is a diagram showing a frame structure to which an M-PSS and an M-SSS are mapped.

FIG. 12 is a diagram showing a frame structure to which an M-PSS and an M-SSS are mapped. In this specification, the M-PSS denotes a P-SS in NB-LTE, and the M-SSS denotes an S-SS in NB-LTE. The M-PSS may also be called an 'NB-PSS', and the M-SSS may also be called an 'NB-SSS.'

Referring to FIG. 12, in the case of the M-PSS, one primary synchronization sequence/signal may be used. The (M-)PSS may span up to a nine-OFDM symbol length, and may be used to determine subframe timing in addition to an accurate frequency offset. This may be construed as a meaning that a UE may use the M-PSS to obtain time synchronization and frequency synchronization with an eNB. In this case, the (M-)PSS may be consecutively located in a time domain.

In the case of the M-SSS, a secondary synchronization sequence may span up to six-OFDM symbol length, and may be used to a cell ID and the timing of an M-frame. This may be construed as a meaning that a UE may use the M-SSS to detect the ID of an eNB. 504 different (M-)SSSs may be designed to support the same number as the number of cell ID groups in LTE.

From the design of FIG. 12, the M-PSS and the M-SSS are repeated every average 20 ms and may be present/generated four times within an 80 ms block. In subframes including synchronization sequences, an M-PSS occupies the last nine OFDM symbols. The M-SSS may occupy sixth, seventh, tenth, eleventh, thirteenth and fourteenth OFDM symbols in the case of a normal CP, and may occupy fifth, sixth, ninth, eleventh and twelfth OFDM symbols in the case of an extended CP.

The nine OFDM symbols occupied by the M-PSS may be selected to provide support for in-band deployment between LTE carriers. The reason for this is that in a hosting LTE system, the first three OFDM symbols of the nine OFDM symbols are used to carry a PDCCH and a subframe includes at least 12 OFDM symbols (in the case of an extended CP).

In the hosting LTE system, a cell-specific reference signal (CRS) is transmitted. Resource elements corresponding to an M-PSS may be punctured in order to avoid a collision. In NB-LTE, specific locations of an M-PSS/M-SSS may be determined to avoid a collision with many legacy LTE signals, such as a PDCCH, PCFICH, PHICH and/or an MBSFN.

The design of a synchronization sequence in NB-LTE may be different with respect to LTE. This may be performed to achieve comprise between reduced memory consumption and faster synchronization in a UE. Since four repetitions are performed in an 80 ms interval, a slight design change of an M-SSS may be necessary in the 80 ms interval in order to solve timing uncertainty.

Structure of M-PSS and M-SSS

In LTE, the structure of a PSS permits the design of low complexity for a timing and frequency offset measurement device, and an SSS is designed to obtain frame timing and to support specific 504 cell IDs.

In the case of the in-band and guard-band of LTE, the deployment of a CP in NB-LTE may be selected to be matched with the CP of a hosting system. In the case of standalone, an extended CP may be used to comply with a transmitter pulse form for applying the least an impact on a hosting system (e.g., GSM).

One M-PSS may be specified in N-LTE of LTE. In a PSS synchronization procedure of LTE, a specific number of frequency estimations for a PSS may be used to coarsely estimate symbol timing and a frequency offset. In NB-LTE, the adoption of such a procedure can improve the processing complexity of a receiver as a plurality of frequency hypotneses is used. In order to solve such a problem, the sequence resembling of a Zadoff-Chu sequence differentially coded in the time domain may be proposed for an M-PSS. Differential decoding may be performed during receiver processing because differential encoding is performed in a transmission step. As a result, a frequency offset may be converted into a fixed phase offset for corresponding symbols from contiguous rotation for the symbols.

Figure 13:
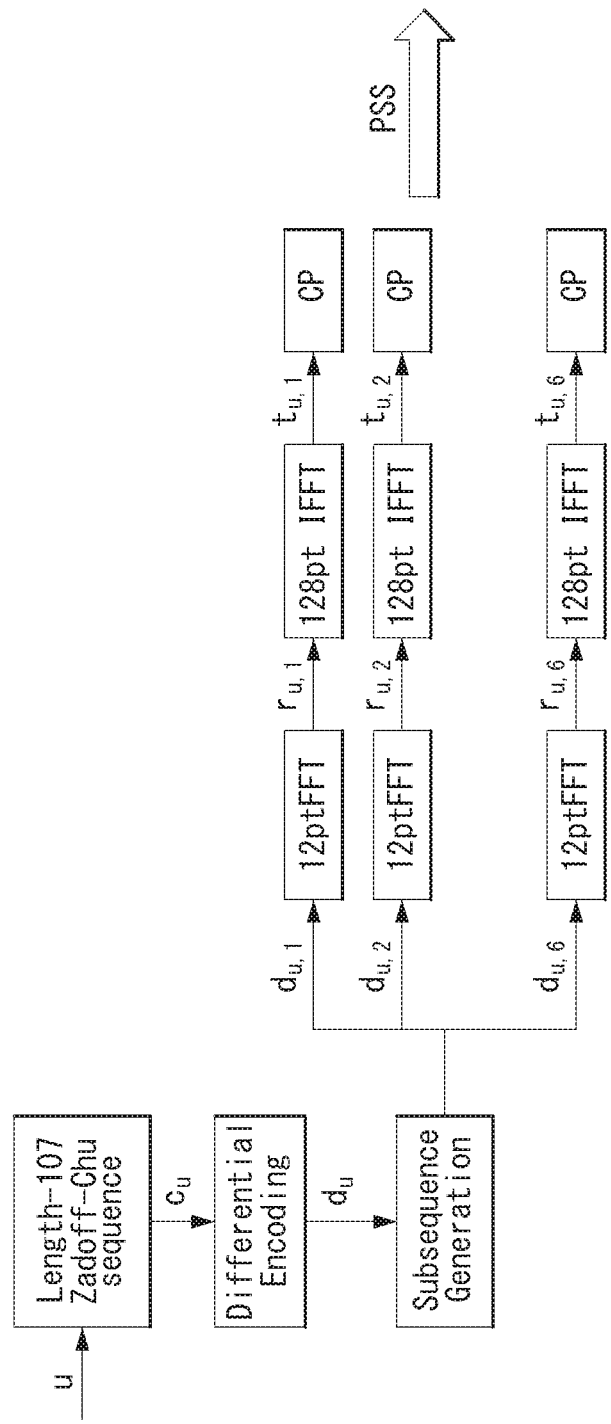
FIG. 13 is a diagram showing a method of generating an M-PSS according to an embodiment of the present invention.

FIG. 13 is a diagram showing a method of generating an M-PSS according to an embodiment of the present invention.

Referring to FIG. 13, first, if a base sequence of a length 107 is started in order to generate an M-PSS, Equation 14 may be obtained.

$$c(n) = e^{-\frac{j\pi un(n+1)}{N}}, n = \{0, 1, 2, \ldots, 106\} \quad \text{[Equation 14]}$$

A base sequence c(n) may be differentially coded in order to obtain a d(n) sequence as in Equation 15.

$$d(n+1)=d(n)c(n), n=\{0,1,2,\ldots,106\}, d(0)=1, \quad \text{[Equation 15]}$$

The d(n) sequence is separated into nine subsequence, and each subsequence has a length 12 and a sampling rate of 130 kHz. 120-point FFT is performed on each of the nine subsequences, and each sequence may be oversampled 128/12 times up to a sample rate of 1.92 MHz using 128 pieces of IFFT zero padding. As a result, each subsequence may be mapped to each of 12 subcarriers for nine OFDM symbols.

Each of the subsequences is mapped to one OFDM symbol and a total of the nine subsequences are present. Accordingly, an M-PSS may occupy all of the nine OFDM symbols. The entire length of the M-PSS may be 1234 (=(128+9)*9+1) if a normal CP of nine samples is used and may be 1440 if an extended CP is used.

An M-PSS to be used actually during transmission does not need to be identically generated each time using a complicated procedure in a transmitter/receiver. A complicated coefficient (i.e., t_u(n)) corresponding to the M-PSS may be generated offline and may be directly stored in the transmitter/receiver. Furthermore, although the M-PSS of 1.92 MHz is generated, an occupied bandwidth may be 180 kHz.

Accordingly, although the receiver performs a procedure related to time and frequency offset measurement using the M-PSS, the entire sampling rate of 192 kHz may be used. This can significantly reduce the complexity of the receiver in cell search.

When compared to LTE, a frequency from which an M-PSS is generated in NB-LTE cause some overhead compared to a PSS in LTE. More specifically, a synchronization sequence used in LTE occupies 2.86% of transmission resources, and a synchronization sequence used in NB-LTE occupies about 5.36% of all of resources. Such additional overhead has an effect in that memory consumption is reduced in addition to a synchronization time that leads to improved battery lifespan and a lower device price.

An M-SSS is designed in the frequency domain and occupies 12 subcarriers in each of 6 OFDM symbols. Accordingly, the number of resource elements dedicatedly allocated (dedicated) to the M-SSS may be 72. The M-SSS may include one ZC sequence of a 61 length padded with eleven '0's at the start point.

In the case of an extended CP, the first 12 symbols of an M-SSS may be discarded, and the remaining symbols may be mapped to valid OFDM symbols. Since the eleven '0's are present at the start point, only one symbol from the length 61 sequence may be discarded. The discard of the symbol causes slight deterioration of the correlation property of another SSS.

The cyclic shift of a sequence and a sequence for a different root may easily provide specific 504 cell IDs. When compared to a case where an M-sequence is used in LTE, the reason why a ZC sequence is used in NB-LTE is to reduce an error detection rate. Since a common sequence for two different cell ID groups is present, an additional procedure in LTE is required.

An M-PSS/M-SSS is generated four times in an 80 ms block, and thus the LTE design of an SSS cannot be used to provide accurate timing information within a corresponding block. The reason for this is that a special interleaving structure capable of determining only two locations is present. Accordingly, a scrambling sequence may be used on the upper side of a ZC sequence in order to provide information about frame timing. A 4-scrambling sequence may be necessary to determine four locations within the 80 ms block, which may have an influence on the acquisition of accurate timing.

Figure 14:
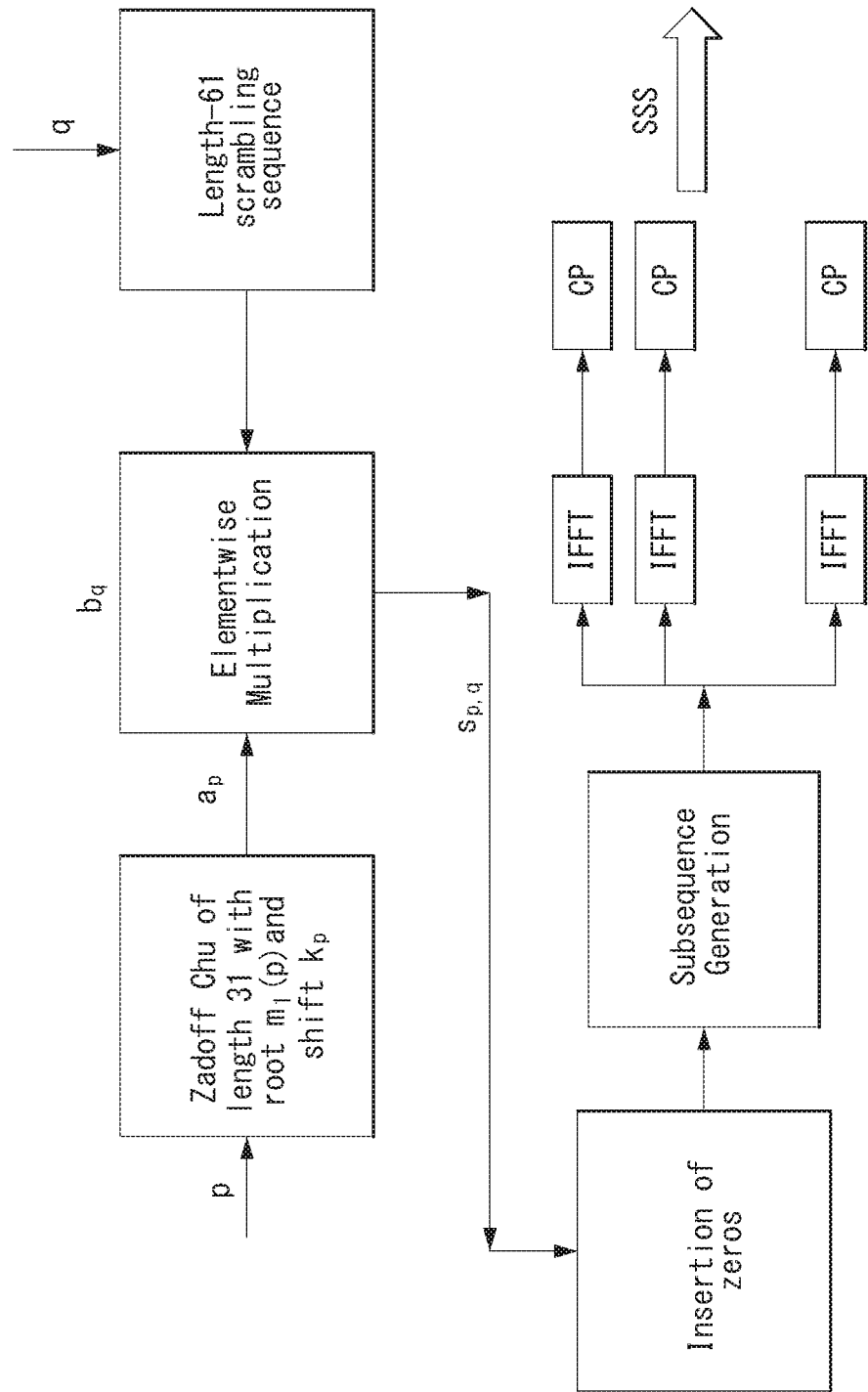
FIG. 14 is a diagram showing a method of generating an M-SSS according to an embodiment of the present invention.

FIG. 14 is a diagram showing a method of generating an M-SSS according to an embodiment of the present invention.

Referring to FIG. 14, an M-SSS may be defined as s_p,q(n)=a_p(n)·b_q(n). In this case, p={0, 1, . . . , 503} indicates a cell ID, and q={0, 1, 2, 3} determines the location of the M-SSS (i.e., the number of M-SSSs within an 80 ms block recently generated prior to an SSS). Furthermore, a_p(n) and b_q(n) may be determined according to Equations 16 and 17.

$$a_p(n) = 0,$$
$$= a_p(n - k_p - 5),$$
$$n = \{0 - 4, 66 - 71\}$$
$$n = \{5, 6, \ldots, 65\}$$
$$a_p(n) = e^{-\frac{j\pi m(p)n(n+1)}{61}},$$
$$n = \{0, 1, \ldots, 61\}$$
[Equation 16]

$$b_q(n) = b(\bmod(n - l_q, 63))$$
$$n = \{0, 1, \ldots, 60\}, q = \{0, 1, 2, 3\},$$
$$l_0 = 0, l_1 = 3, l_2 = 7, l_3 = 11$$
$$b(n + 6) = \bmod(b(n) + b(n + 1), 2),$$
$$n = \{0, 1, \ldots 55\}, b(0) = 1, b(m) = 0,$$
$$m = \{1, 2, 3, 4, 5\}$$
[Equation 17]

Referring to Equation 16, a_p(n) is a ZC sequence and may determine a cell ID group. m(p) and the cyclic shift k_p may be used to provide a specific cell ID. Referring to Equation 17, b_q(n) may be a scrambling sequence having the cyclic shift of the base sequence b_(n), and may be used to indicate the location of an M-SSS within an M-frame in order to obtain frame timing. The cyclic shift 1_q may be determined depending on a q value.

An m(p) value for a specific p may be determined like m(p)=1+mod(p, 61), and a k_p value may be determined like k_p=7[p/61].

Operating System of NB-LTE System

Figure 15:
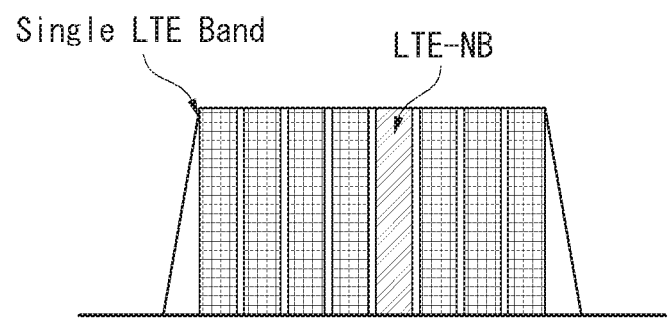
FIG. 15 is a diagram showing an example the operating system of an NB LTE system to which a method proposed by this specification may be applied.
Figure 15:
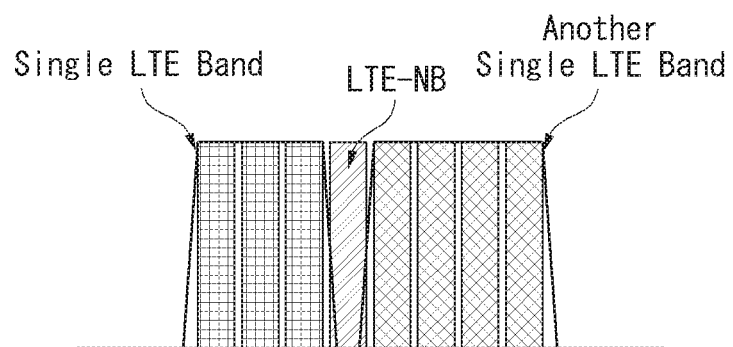
Figure 15:
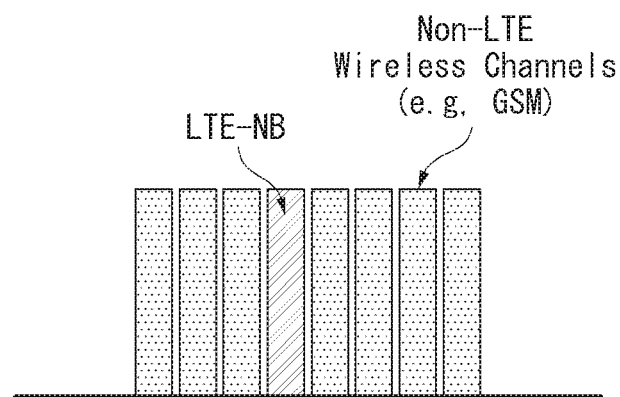

FIG. 15 is a diagram showing an example the operating system of an NB LTE system to which a method proposed by this specification may be applied.

Specifically, FIG. 15(a) shows an in-band system, FIG. 15(b) shows a guard-band system, and FIG. 15(c) shows a standalone system.

The in-band system may be expressed as an in-band mode, the guard band system may be expressed as a guard band mode, and a standalone system may be expressed as a standalone mode.

The in-band system of FIG. 15(a) refers to a system or mode in which a specific 1 RB within a legacy LTE band is used for NB-LTE (or LTE-NB), and may be operated by allocating some resource blocks of an LTE system carrier.

The guard-band system of FIG. 15(b) refers to a system or mode in which NB-LTE is used in the space reserved for the guard band of a legacy LTE band, and may be operated by allocating the guard-band of an LTE carrier not used as a resource block in the LTE system.

A legacy LTE band has a guardband of at least 100 kHz at the last of each LTE band.

In order to use 200 kHz, two non-contiguous guardbands may be used.

The in-band system and the guard-band system show structures in which NB-LTE coexists within a legacy LTE band.

In contrast, the standalone system FIG. 12(c) refers to a system or mode configured independently of a legacy LTE band, and may be operated by separately allocating a frequency band (GSM carrier reallocated in the future) used in the GERAN.

Design Proposal of M-PSS and M-SSS in NB-LTE System

NB-LTE corresponds to a system for supporting low complexity and low power consumption having a system bandwidth corresponding to one physical resource block (PRB) of an LTE system. This may be chiefly used as a communication method for implementing Internet of things (IoT) by supporting a device, such as machine-type communication (MTC), in the cellular system. In NB-LTE, there is an advantage in that frequency resources can be used more efficiently because 1 PRB for NB-LTE is allocated to a legacy LTE band without the allocation of an additional band using OFDM parameters, such as subcarrier spacing, as in the existing LTE.

In this specification, for distinguishment from the legacy LTE system, "M-" is added to a physical channel of downlink in NB-LTE (e.g., an M-PSS/M-SSS, M-PBCH, M-PDCCH/M-EPDCCH or M-PDSCH).

If an operation of NB-LTE as the in-band system is taken into consideration, it is important to guarantee performance, such as a legacy CRS, a legacy PDCCH and a legacy sync signal and to design a synchronized signal of NB-LTE. This specification proposes a method of transmitting an M-PSS using a legacy multicast-broadcast single-frequency network (MBSFN) subframe by taking into consideration that NB-LTE operates as the in-band system.

Figure 16:
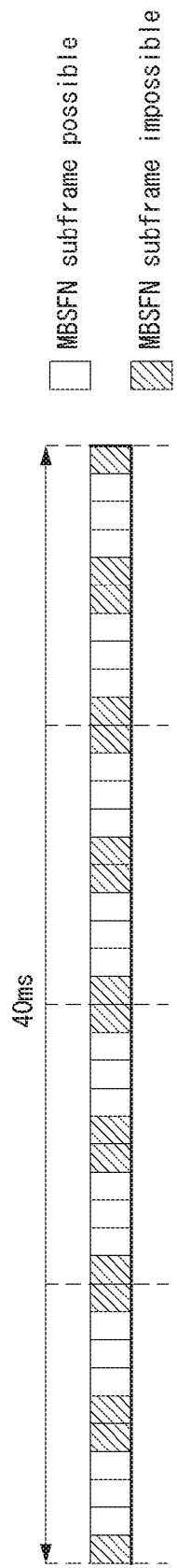
FIG. 16 is a diagram showing a legacy MBSFN subframe.

FIG. 16 is a diagram showing a legacy MBSFN subframe.

Hereinafter, in describing the location of a subframe, the location of a subframe sequentially counted based on a "0$^{th}$" (zeroth) subframe", that is, the first subframe, is basically described (e.g., 0$^{th}$, 1$^{st}$, and 2$^{nd}$).

A legacy MBSFN subframe may correspond to the 1$^{st}$, 2$^{nd}$, 3$^{rd}$, 6$^{th}$, 7$^{th}$ and 8$^{th}$ subframes of a legacy radio frame other than 0$^{th}$, 4$^{th}$, 5$^{th}$ and 9$^{th}$ subframes in which a legacy sync signal and paging are transmitted in the case of FDD. Furthermore, in the case of TDD, a legacy MBSFN subframe may correspond to the #3 (or 3$^{rd}$), #4 (or 4$^{th}$), #7 (or 7$^{th}$), #8 (or 8$^{th}$), and #9 (or 9$^{th}$) subframe of a legacy radio frame. The MBSFN subframe may be selected as several subframes at the same time. If a subframe configurable as an MBSFN subframe is expressed as four radio frame (i.e., 40 ms) interval, it may be shown as in FIG. 13. Referring to FIG. 13, for example, if a first subframe has been configured as a legacy MBSFN subframe in an eNB, the first subframe operates as the MBSFN subframe in a 40 ms period.

Recently, for system capability improvement, a method of transmitting a PDSCH instead of a physical multicast channel (PMCH) through a specific subframe configured as an MBSFN subframe was actually taken into consideration. In this specification, as described above, an MBSFN subframe in which a PDSCH is transmitted is referred to as a fake-MBSFN subframe (F-MBSFN subframe)."

If NB-LTE operates as an in-band system using such an F-MBSFN subframe, the F-MBSFN subframe may be used to transmit a synchronization signal (sync signal) (e.g., an M-PSS and/or an M-SSS) for NB-LTE. Alternatively, the F-MBSFN subframe may be used to schedule the control/ data of an NB-LTE apparatus or may be used for scheduling for a legacy UE that supports transmission mode (TM) 9/10.

Hereinafter, the (first) eNB is assumed to be aware of the location of a subframe corresponding to an MBSFN subframe in which a PMCH will be actually transmitted. Base on such a hypotnesis, the eNB may configure a specific subframe that belongs to subframes selectable as an MBSFN subframe and that excludes a subframe in which the PMCH will be actually transmitted as an F-MBSFN subframe, and may configure the F-MBSFN subframe so that a synchronization signal (M-PSS/M-SSS) of NB-LTE is transmitted in the F-MBSFN subframe.

For example, it may be assumed that the $1^{st}$ and $3^{rd}$ subframes of the $0^{th}$ radio frame of the four radio frames of FIG. 13 have been configured as MBSFN subframes in which a PMCH will be actually transmitted. In this case, an eNB may select one or two of the $2^{nd}$, $6^{th}$, $7^{th}$ and $8^{th}$ subframes of a $0^{th}$ radio frame and the $1^{st}$, $2^{nd}$, $3^{rd}$, $6^{th}$, $7^{th}$ and $8^{th}$ subframes of $1^{st}$, $2^{nd}$ and $3^{rd}$ radio frames as F-MBSFN subframes, and may configure an M-PSS to be transmitted through one of the selected F-MBSFN subframes. If the number of times that the M-PSS must be transmitted within 40 ms is K, at least K/two F-MBSFN subframes may be necessary because two M-PSSs may be transmitted in one subframe.

If one or more F-MBSFN subframes are required within 40 m, spacing between the two subframes needs to be specified for an NB-LTE UE. The spacing specified as described above has a disadvantage in that a plurality of subframes has to be configured as MBSFN subframes from a viewpoint of a network. In order to solve such a disadvantage, spacing between the two subframes may not be specified (or may be various).

However, such a method may increase complexity in detecting, by a UE, a synchronization signal. If spacing between subframes is constant, an M-PSS may be assumed to be transmitted through contiguous subframes (in the case of FDD) or to be transmitted at specific intervals, such as transmission at intervals of 5 ms (in the case of TDD).

In another embodiment, redundant M-PSSs may be transmitted through different frequency resources. A frequency gap between frequency resources in which M-PSSs redundant as described above are transmitted may have been previously set/designated.

For example, if an M-PSS is transmitted through a PRB #M, an M-PSS overlapping the corresponding M-PSS may be transmitted through a PRB #M−1. This may mean that a UE that has detected the M-PSS through the PRB #M also has to perform M-PSS detection through the PRB #M−1 or the PRB #M+1. This may be considered that a sampling rate has been doubled from a viewpoint of the UE.

Alternatively, it may be assumed that the transmission peroid of the M-PSS does not need to be increased because power boosting is always used instead of such transmission.

Figure 17:
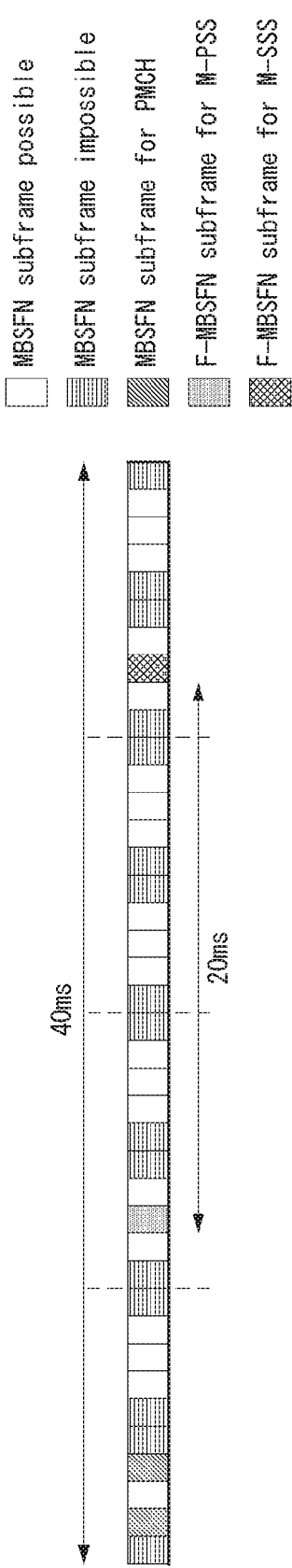
FIG. 17 is a diagram showing four radio frames to each of which an M-PSS and an M-SSS are mapped along with MBSFN subframes according to an embodiment of the present invention.

FIG. 17 is a diagram showing four radio frames to each of which an M-PSS and an M-SSS are mapped along with MBSFN subframes according to an embodiment of the present invention.

Referring to FIG. 17, if the second subframe of a first radio frame is selected as an F-MBSFN subframe in which an M-PSS will be transmitted, the second subframe of a third radio frame 20 ms spaced from the corresponding (F-) MBSFN subframe (i.e., spaced by two radio frames), it is configured as an F-MBSFN subframe in which an M-SSS will be transmitted.

Additionally, in order to reduce an impact on the legacy LTE system, it is better to set low the number of MBSFN subframes assigned by an eNB. Accordingly, unlike in the proposed method, a configuration may be performed so that an M-PSS and an M-SSS are mapped to the same F-MBSFN subframe.

Figure 18:
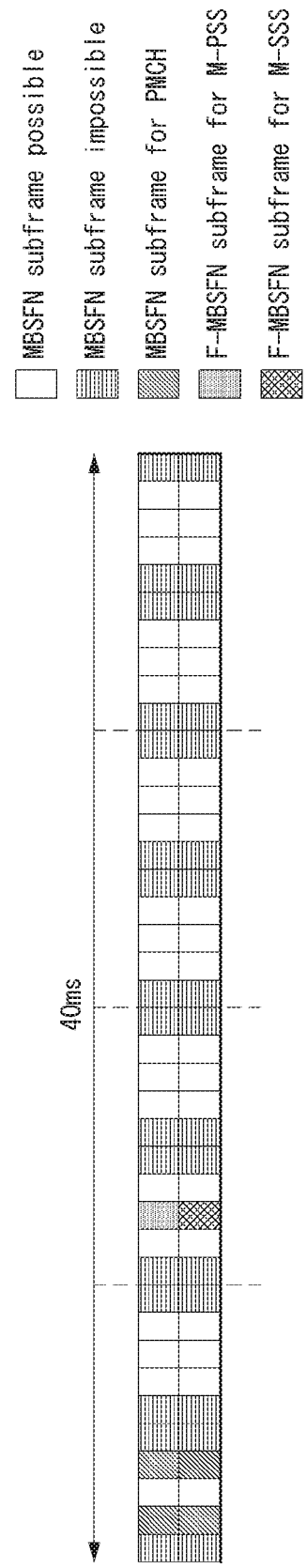
FIG. 18 is a diagram regarding an embodiment in which M-PSSs and M-SSSs are mapped to the same F-MBSFM subframes according to an embodiment of the present invention.

FIG. 18 is a diagram regarding an embodiment in which M-PSSs and M-SSSs are mapped to the same F-MBSFM subframes according to an embodiment of the present invention.

Referring to FIG. 18, an M-PSS may be mapped/transmitted in 1 RB of the same F-MBSFN subframes and an M-SSS may be mapped/transmitted in another 1 RB (e.g., 1 RB neighboring the corresponding RB or 1 RB spaced apart from the corresponding RB at a specific interval). In this case, an MTC UE may perform M-PSS detection on one RB of several candidates in order to first decode the M-PSS.

If the M-PSS detection is successful, the UE may perform M-SSS detection on 1 RB neighboring the RB from which the detection of the M-PSS was successful. In this case, the UE cannot detect the M-PSS and the M-SSS at the same time, but can reduce an impact on a legacy LTE system because both the M-PSS and the M-SSS are transmitted in one MBSFN subframe and the number of MBSFN subframes that needs to be allocated by an eNB is reduced.

Figure 19:
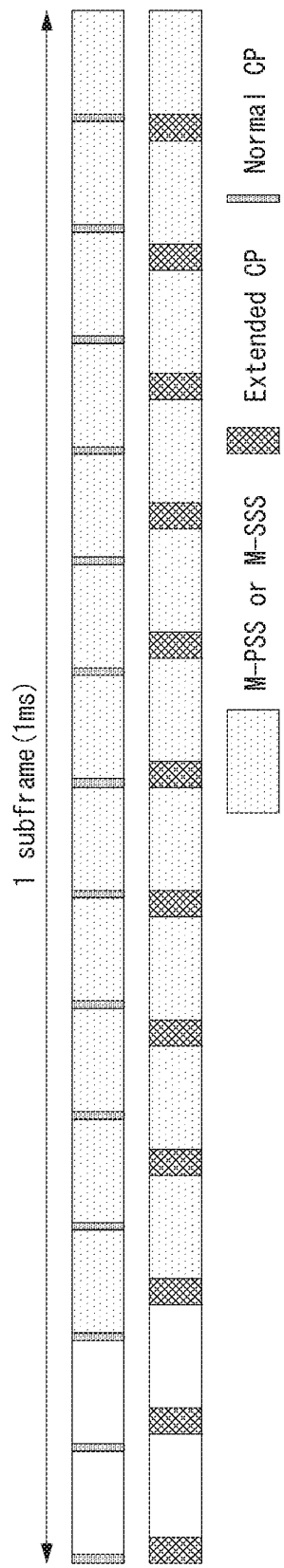
FIG. 19 is a diagram showing that an F-MBSFN subframe according to an embodiment of the present invention is divided into the case of a normal CP and the case of an extended CP.

FIG. 19 is a diagram showing that an F-MBSFN subframe according to an embodiment of the present invention is divided into the case of a normal CP and the case of an extended CP.

The CP of a subframe selected as an F-MBSFN subframe is configured to be the same as the CP of the $0^{th}$ subframe of a radio frame included in the corresponding subframe. Accordingly, the F-MBSFN subframe may be a normal CP or extended CP depending on the CP of the $0^{th}$ subframe of the corresponding radio frame, as shown in FIG. 16.

As in FIG. 19, the first two OFDM symbols of an MBSFN subframe cannot be used to transmit other information for a legacy PHICH, a PCFICH, a PDCCH and a CRS. Accordingly, for a synchronization signal (M-PSS/M-SSS), 12 OFDM symbols may be used in the case of a normal CP, and 10 OFDM symbols may be used in the case of an extended CP.

In the case of the normal CP in which the 12 OFDM symbols may be used, a legacy PSS/SSS sequence may be used as the sequence of the M-PSS/M-SSS without any change, a new M-PSS/M-SSS sequence may be used as the sequence of the M-PSS/M-SSS, or the sequence of the M-PSS/M-SSS may be generated by duplicating/repeating an M-PSS/M-SSS sequence corresponding to the 6 OFDM symbols twice.

In contrast, in the case of the extended CP in which the 10 OFDM symbols may be used, a legacy PSS/SSS sequence cannot be used without any change, but a change is necessary so that the sequence can be generated by duplicating/ repeating an M-PSS/M-SSS sequence corresponding to 5 OFDM symbols twice. Detailed embodiments thereof are described later in relation to FIGS. 20 to 29. In the following embodiments, a transmission method of an M-PSS is chiefly described, but the following embodiments may be applied to the transmission method of an M-SSS identically/similarly.

1. Embodiment of an M-PSS (or M-SSS) Mapped to 6 OFDM Symbols in the Case of a Normal CP FIG. 20 is a diagram showing a legacy PSS sequence.

Figure 20:
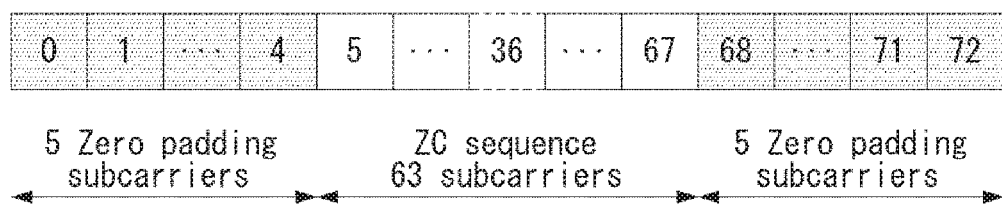
FIG. 20 is a diagram showing a legacy PSS sequence.

Referring to FIG. 20, after a Zadoff-Chu (ZC) sequence of a 63 length is first generated, a ZC sequence of a 62 length from which one DC carrier has been subtracted is generated. A sequence of a total 72 length may be generated as a legacy PSS sequence by inserting/attaching 5 zero paddings to each of both ends of the generated ZC sequence. The generated legacy PSS sequence is divided into 72 subcarriers (or through 72 subcarriers) and transmitted.

Figure 21:
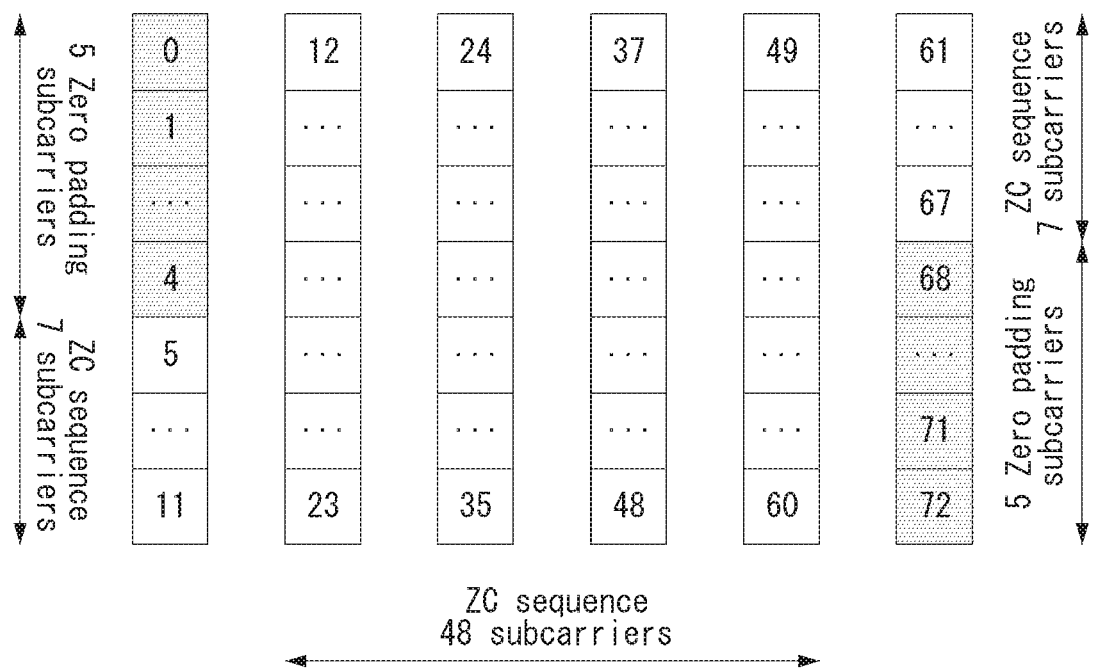
FIG. 21 is a diagram showing a method of transmitting an M-PSS (or M-SSS) sequence if a normal CP has been applied in accordance with a second embodiment of the present invention.

FIG. 21 is a diagram showing a method of transmitting an M-PSS (or M-SSS) sequence if a normal CP has been applied in accordance with a second embodiment of the present invention.

Referring to FIG. 21, a configuration may be performed so that a legacy PSS (or SSS) sequence is divided into 6 equal parts and an M-PSS (or M-SSS) is divided into 6 OFDM symbols and transmitted. This method has an advantage in that the legacy PSS (or SSS) sequence is used in terms of an implementation, but there is almost no gain for a portion in which 5 zero paddings are contiguously disposed compared to the transmission method of the legacy PSS (or SSS) sequence.

Figure 22:
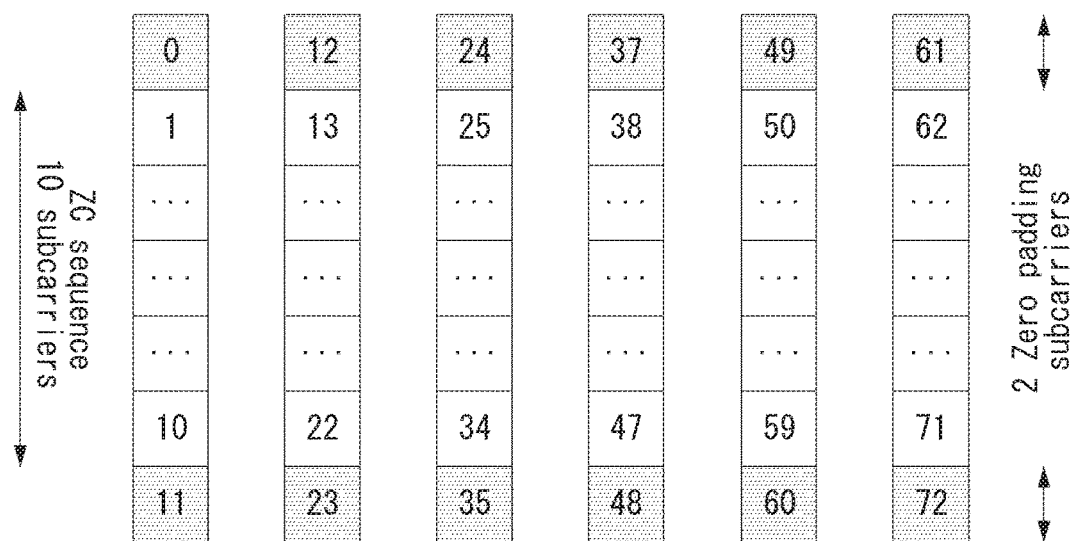
FIG. 22 is a diagram showing a method of transmitting an M-PSS (or M-SSS) sequence if a normal CP has been applied in accordance with a second embodiment of the present invention.

FIG. 22 is a diagram showing a method of transmitting an M-PSS (or M-SSS) sequence if a normal CP has been applied in accordance with a second embodiment of the present invention.

Referring to FIG. 22, an M-PSS (or M-SSS) sequence may be transmitted by disposing zero padding locations at the subcarriers of both ends of each OFDM symbol. That is, when the M-PSS (or M-SSS) sequence is transmitted, a legacy ZC sequence is used, but a ZC sequence of a 60 length obtained by puncturing the center $29^{th}$, $30^{th}$ and $31^{st}$ samples of the ZC sequence of a 63 length may be used. Alternatively, the M-PSS (or M-SSS) sequence may be configured in such a manner in which a new ZC sequence of a 61 length other than a legacy ZC sequence is generated and zero padding has been inserted into the top subcarrier and bottom subcarrier of each of 6 OFDM symbols using a ZC sequence of a 60 length in which a $30^{th}$ sample in the middle has been punctured.

The present embodiment may be difficult to implement compared to the first embodiment, but has an advantage in that the same deployment of zero padding as that of the present embodiment can obtain a guard band effect. Additionally, the present embodiment may be applied to an F-MBSFN subframe (to which a normal CP has been applied) configured to transmit an M-PSS (or M-SSS), but may be applied to any method of transmitting an M-PSS (or M-SSS) within continuous 6 symbols or discontinuous 6 symbols.

Figure 23:
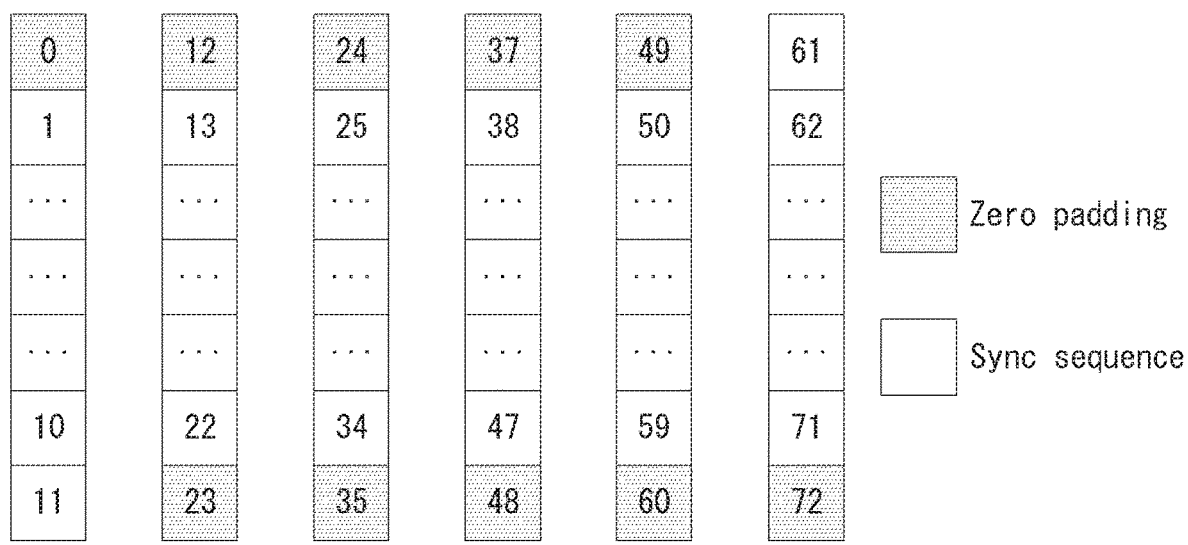
FIG. 23 is a diagram showing a method of transmitting an M-PSS (or M-SSS) sequence if a normal CP has been applied in accordance with a third embodiment of the present invention.

FIG. 23 is a diagram showing a method of transmitting an M-PSS (or M-SSS) sequence if a normal CP has been applied in accordance with a third embodiment of the present invention.

Referring to FIG. 23, an M-PSS (or M-SSS) sequence is transmitted using a legacy PSS (or SSS) sequence, but may be transmitted in a such a manner that specific 10 subcarriers of subcarriers (i.e., 12 resource elements) at both sides of each symbol are mapped/filled with zero padding and the remaining subcarriers are sequentially mapped/filled with a legacy PSS (or SSS) sequence from the first symbol.

The present embodiment has an advantage in that a legacy PSS (or SSS) sequence can be used and has an advantage in that the deployment of zero padding can obtain a guard band effect compared to the second embodiment.

Meanwhile, whether an MTC UE currently operates in the in-band system or the standalone system may be determined using the aforementioned first to third embodiments.

For example, if an M-PSS is transmitted according to the first embodiment of FIG. 21, an MTC UE may determine that it currently operates in the in-band system. If the M-PSS is transmitted according to the second embodiment of FIG. 22, the MTC UE may determine that it currently operates in the standalone system. In contrast, if the M-PSS is transmitted according to the first embodiment of FIG. 21, the MTC UE may determine that it currently operates in the standalone system. If an M-PSS is transmitted according to the second embodiment of FIG. 22, the MTC UE may determine that it currently operates in the in-band system.

That is, the MTC UE may detect the M-PSS by hypothesizing predetermined two situations. The MTC UE determines whether it currently operates in the in-band system or the standalone system based on a result of the detection.

Figure 24:
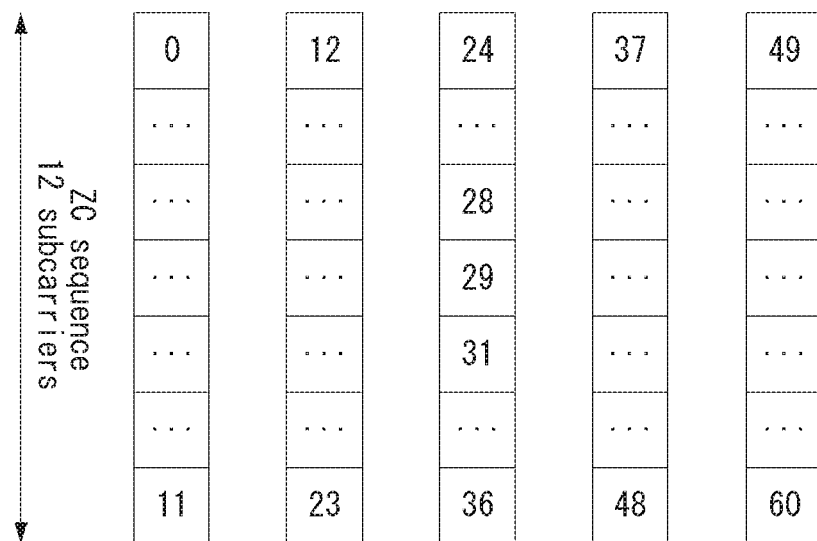
FIGS. 24 and 25 are diagrams showing a method of transmitting an M-PSS (or M-SSS) sequence if an extended CP has been applied in accordance with a fourth embodiment of the present invention.
Figure 25:
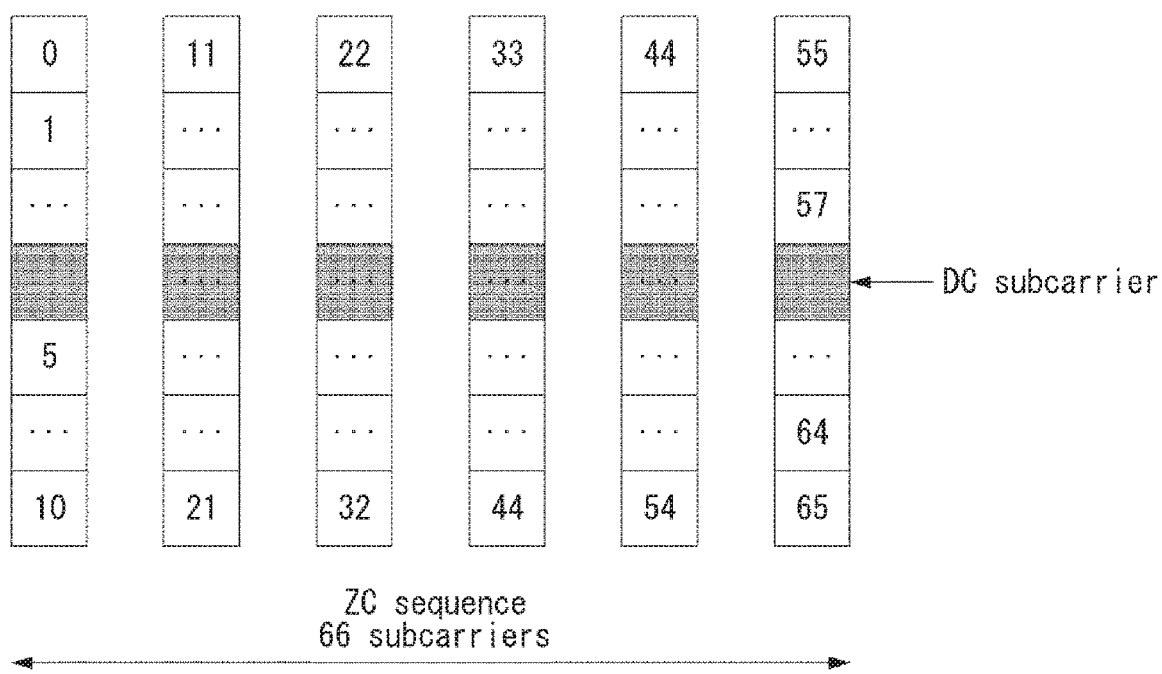

2. Embodiment of an M-PSS (or M-SSS) Mapped to 5 OFDM Symbols in the Case of an Extended CP FIGS. 24 and 25 are diagrams showing a method of transmitting an M-PSS (or M-SSS) sequence if an extended CP has been applied in accordance with a fourth embodiment of the present invention.

In the case of an extended CP, a legacy PSS sequence cannot be simply cut and used when an M-PSS (or M-SSS) is transmitted because all of the M-PSSs must be transmitted within 5 symbols. Accordingly, the present embodiment proposes that when an M-PSS (or M-SSS) is transmitted, a legacy ZC sequence is used as in the second embodiment, but the M-PSS (or M-SSS) is divided into five symbols and transmitted by using a ZC sequence of a 60 length obtained by puncturing the center $29^{th}$, $30^{th}$ and $31^{st}$ samples of a ZC sequence of a 63 length or by generating a new ZC sequence of a 61 length other than a legacy ZC sequence and using a ZC sequence of a 60 length in which a center $30^{th}$ sample has been punctured. This is shown in FIG. 21.

Additionally, the present embodiment may be applied to an F-MBSFN subframe (extended CP has been applied) configured to transmit an M-PSS (or M-SSS), and may be applied to all of methods of transmitting an M-PSS (or M-SSS) within contiguous 5 symbols or discontiguous 5 symbols.

If a DC carrier is taken into consideration, assuming that in the case of a normal CP, when an M-PSS (or M-SSS) is transmitted using 6 symbols, each of the 6 symbols is used as one DC carrier, a total of 66 resource elements may be used. In this case, as in FIG. 22, the M-PSS (or M-SSS) may be mapped to the 66 resource elements by repeating a ZC sequence of a 62 length.

Figure 26:
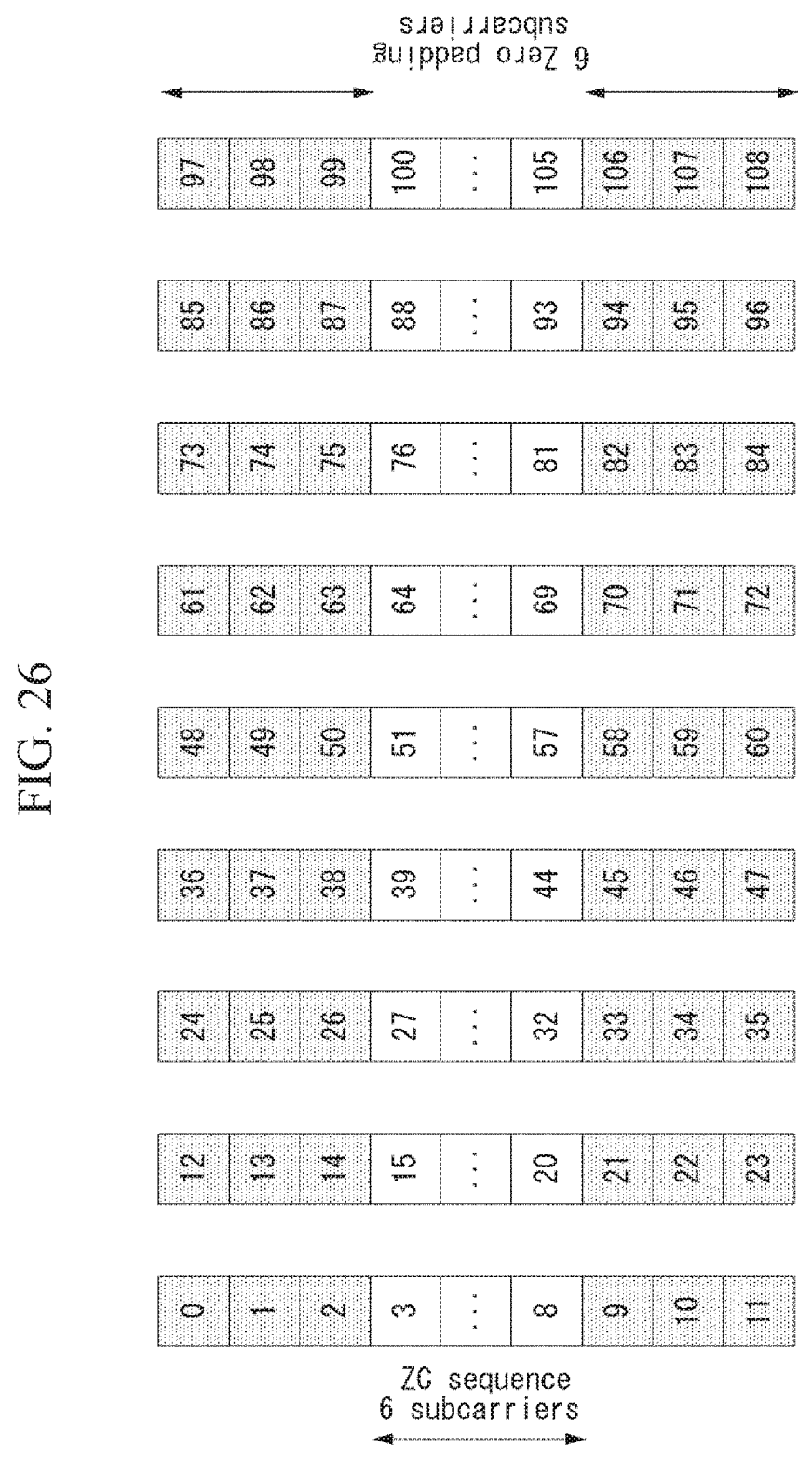

FIG. 26 is a diagram showing a method of transmitting an M-PSS (or M-SSS) sequence if an extended CP has been applied in accordance with a fifth embodiment of the present invention.

For the coexistence of a narrow band system using 1 RB and a legacy LTE system, the narrow band system may be configured to use some of the entire 180 kHz bandwidth without using the entire 180 kHz bandwidth based on the 1 RB. That is, assuming that 15 kHz subcarrier spacing is taken into consideration, if 12 subcarriers have been used in an 180 kHz bandwidth, all of the 12 subcarriers are not used, and only 6 or 7 subcarriers may be used, for example.

Assuming that 6 subcarriers have been configured to be used, if the number of available symbols within one subframe is 9, a total of 54 resource elements of the one subframe may be used. Assuming that 7 subcarriers have been configured to be used, a total of 63 resource elements of one subframe may be used. If 7 subcarriers are used, they may be configured to be used as a legacy ZC sequence. If 6 subcarriers are used, a legacy ZC sequence is used, but a ZC sequence of a 54 length other than 9 samples may be used or a new ZC sequence of a 54 length may be used.

The aforementioned embodiment may be applied to a case where a different number of subcarriers other than 6 or 7 subcarriers are used identically/similarly. In this case, a method of using a ZC sequence of a length identical with/corresponding to the number of subcarriers may be applied identically/similar to the aforementioned embodiment. If specific portions of subcarriers at both ends are made empty as described above, a guard band effect can be obtained, and one example thereof is shown in FIG. 23.

A sequence may be repeated and transmitted using a method of transmitting 2 copies in one F-MBSFN subframe of a 40 ms period, which is described later in FIG. 24.

Figure 27:
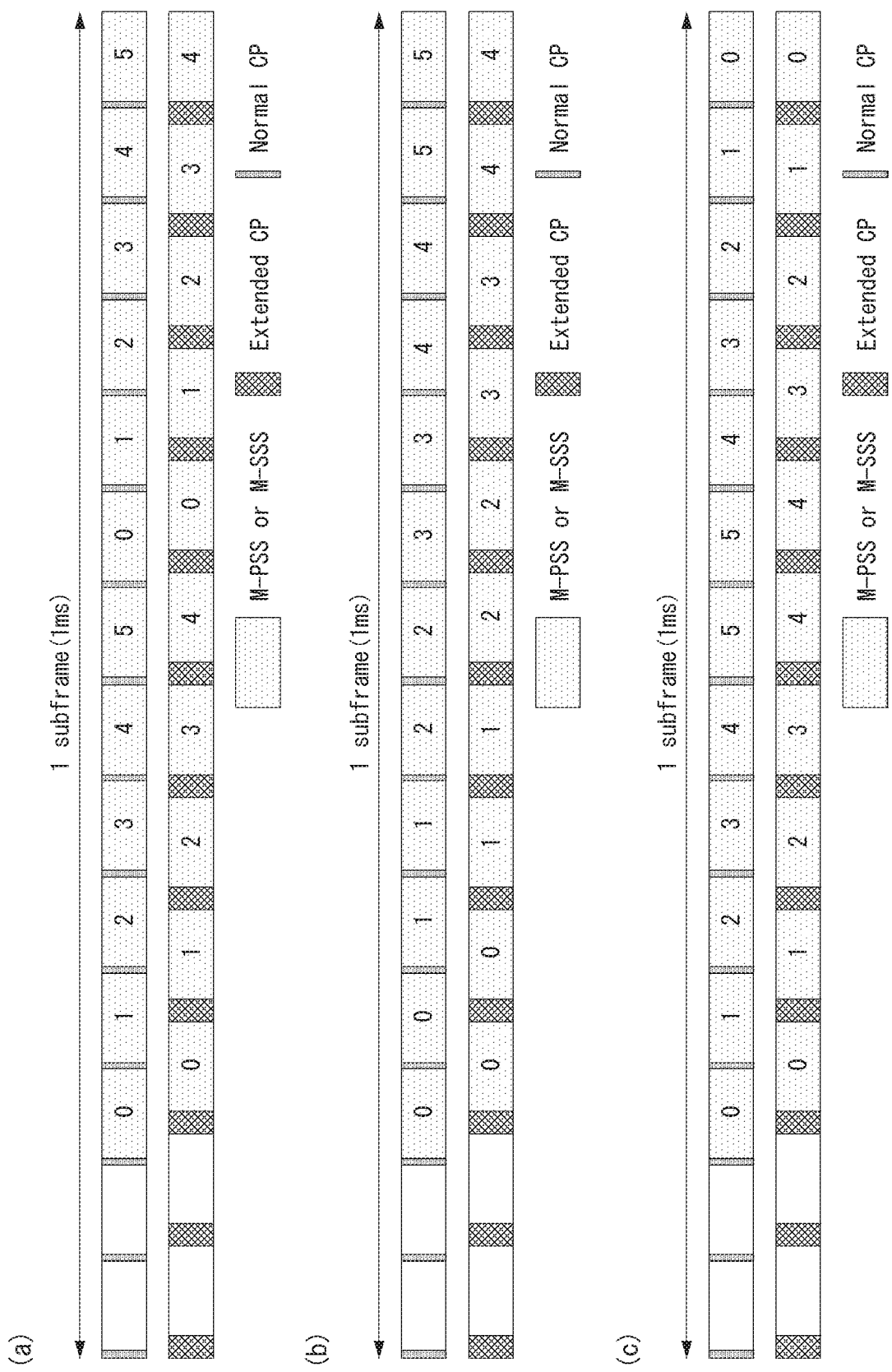
FIG. 27 is a diagram showing the repetition structure of an M-PSS sequence or an M-SSS sequence according to embodiments of the present invention.

FIG. 27 is a diagram showing the repetition structure of an M-PSS sequence or an M-SSS sequence according to embodiments of the present invention.

In one embodiment, referring to FIG. 27(a), the repetition structure of an M-PSS/M-SSS sequence may be configured by dividing and putting/mapping one M-PSS/M-SSS sequence to contiguous 6 (or 5) symbols and then putting/mapping the duplication sequence of a corresponding M-PSS/M-SSS sequence to the contiguous 6 (or 5) symbols.

In another embodiment, referring to FIG. 24(b), the repetition structure of an M-PSS/M-SSS sequence may be configured by first putting/mapping the first sequence of an M-PSS/M-SSS sequence equally divided into contiguous two symbols into 6 parts (or 5 parts) and putting/mapping a next M-PSS/M-SSS sequence to next contiguous two symbols.

In yet another embodiment, the repetition structure of an M-PSS/M-SSS sequence may be configured in a form in which sequences mapped to symbols on both sides of a specific location are mirrored, as shown in FIG. 24(c).

If the aforementioned transmission method is used, differential ZC sequences may be used as a copy 1 (original sequence) and a copy 2 (a sequence generated based on the original sequence). That is, if the first sequence is called an S1 and a second sequence generated based on the S1 is called an S2, the S2 may be generated using a differential ZC sequence as a conjugate of the S1. This may be more effective when it is used in the repetition structure proposed in FIG. 24. Since the same sequence is transmitted in contiguous symbols, it may be very effective to modify a frequency offset.

An MTC UE may determine whether it currently operates in the in-band system or the standalone system using the proposed embodiments.

For example, if an M-PSS such as FIG. 27(a) is transmitted, an MTC UE may determine that it currently operates in the in-band system. If an M-PSS such as FIG. 24(b) is transmitted, the MTC UE may determine that it currently operates in the standalone system. If an M-PSS such as FIG. 27(a) is transmitted, the MTC UE may determine that it currently operates in the standalone system. If an M-PSS such as FIG. 27(b) is transmitted, the MTC UE may determine that it currently operates in the in-band system.

That is, the MTC UE may detect the M-PSS by hypothesizing predetermined two situations, and determines whether it currently operates in the in-band system or the standalone system based on a result of the detection.

Furthermore, the index of a subframe configured to transmit an M-PSS in 40 ms may be assumed to be always a subframe #0 or subframe #5 (or may be set as another subframe index) from a standpoint of an NB-LTE cell. A relative location of a subframe in which the M-PBCH of NB-LTE is transmitted may be assumed to be always the same based on the index of the subframe.

That is, a legacy cell may select one subframe of frames capable of an MBSFN as a subframe in which an M-PSS is transmitted in a cycle of 40 ms, and the index of such a subframe may be the same from a standpoint of NB-LTE. Accordingly, if an NB-LTE UE uses a legacy CRS, it is necessary to set the subframe index of a legacy cell and the offset of a subframe of NB-LTE.

In this case, an M-PSS may be transmitted as in the standalone system and the in-band system. In the case of the standalone system, a cyclic prefix (CP) may be assumed to be applied as a normal CP or extended CP or to be always applied as a normal CP.

An M-SSS may be transmitted identically or differently in the in-band system and standalone system. If the M-SSS is transmitted identically in the in-band system and standalone system, indication regarding whether it is the standalone system or the in-band system may be provided in an M-PBCH. If the M-SSS is transmitted differently in the in-band system and standalone system, frequency domain/resources in which an M-PSS and M-SSS are transmitted may be different for each system or a time difference may be different in a time domain, or different sequences may be used. If the systems are distinguished using such a method, when an UE selects a cell by performing measurement, it may first select a standalone cell. That is, if a difference between the SINRs of two cells is within a preset range based on a result of the measurement of the SINRs of the two cells, the UE may first access a standalone cell.

Operation of NB-LTE UE

Assuming that a synchronization signal of NB-LTE is transmitted as in FIG. 12, it is necessary for MTC UEs configured in an eNB to determine whether a system to which the MTC UEs belong is the in-band system or the standalone system through M-PSS detection. Hereinafter, there is proposed an operation of an NB-LTE UE for determining a system to which the NB-LTE UE belongs as described above.

The $7^{th}$, $8^{th}$ and $11^{th}$ symbols of the symbols in which the M-PSS is transmitted in FIG. 12 are symbols in which a legacy CRS is transmitted, and an eNB of NB-LTE operating in the in-band system punctures a CRS location and transmits the M-PSS with the legacy CRS maintained. Accordingly, first, an MTC UE assumes that an M-PSS (information) is transmitted in the 6 symbols ($5^{th}$, $6^{th}$, $9^{th}$, $10^{th}$, $12^{th}$ and $13^{th}$ symbols) other than $7^{th}$, $8^{th}$ and $11^{th}$ symbols, and may attempt M-PSS detection using the corresponding 6 symbols.

If the UE has accurately detected an M-PSS (e.g., if all of the M-PSSs have been actually transmitted in the 6 symbols ($5^{th}$, $6^{th}$, $9^{th}$, $10^{th}$, $12^{th}$ and $13^{th}$ symbols)), the UE may determine whether a corresponding system is the in-band system or the standalone system. As a precondition for this, an M-PSS sequence needs to be differently transmitted in the case of the in-band system and the case of the standalone system.

However, if the UE has not accurately detected an M-PSS through the 6 symbols (e.g., although all of M-PSSs (information) have been actually transmitted in the 6 symbols ($5^{th}$, $6^{th}$, $9^{th}$, $10^{th}$, $12^{th}$ and $13^{th}$ symbols), the UE has failed in detecting an M-PSS or if the M-PSS (information) has been actually transmitted in 9 symbols ($5^{th}$~$13^{th}$ symbols)), the UE may attempt M-PSS detection using a total of the 9 symbols ($5^{th}$~$13^{th}$ symbols) including the 3 symbols ($7^{th}$, $8^{th}$ and 11$^{th}$ symbols) excluded at a point of time at which a next synchronization signal is transmitted.

In this case, if the UE has accurately detected the M-PSS, it may determine whether a corresponding system is the in-band system or the standalone system. As a precondition for this, an M-PSS sequence must be differently transmitted in the case of the in-band system and the standalone system.

If the UE first determined whether a corresponding system is the in-band system or the standalone system through M-PSS detection, it may determine whether to detect the M-PSS using some symbols when detecting a next M-PSS based on a result of the determination. An eNB configured in the MTC UE may operate as one of the in-band system and the standalone system, and the M-PSS has been configured to be divided into the 6 or 9 symbols and transmitted. Accordingly, the MTC UE may determine whether it will detect the M-PSS through some symbols depending on that the eNB transmits the M-PSS through some symbol.

For example, if an eNB configured in an MTC UE operates in the in-band system and an M-PSS (information) is transmitted through 6 symbols (5$^{th}$, 6$^{th}$, 9$^{th}$, 10$^{th}$, 12$^{th}$ and 13$^{th}$ symbols), the MTC UE may first determine whether a corresponding system is the in-band system through M-PSS detection. Furthermore, the MTC UE is aware that the M-PSS (information) is transmitted through the 6 symbols (5$^{th}$, 6$^{th}$, 9$^{th}$, 10$^{th}$, 12$^{th}$ and 13$^{th}$ symbols), and thus may attempt M-PSS detection using the 6 symbols (5$^{th}$, 6$^{th}$, 10$^{th}$, 12$^{th}$ and 13$^{th}$ symbols) when detecting a next M-PSS.

In contrast, although an eNB configured in an MTC UE operates in the in-band system, if an M-PSS (information) is transmitted through the 9 symbols (5$^{th}$~13$^{th}$ symbols), the MTC UE may first determine whether a corresponding system is the in-band system through M-PSS detection. Furthermore, the MTC UE is aware that the M-PSS is transmitted through the 9 symbols (5$^{th}$~13$^{th}$ symbols), and thus may attempt M-PSS detection using the 9 symbols (5$^{th}$~13$^{th}$ symbols) when detecting a next M-PSS.

As an additional example of the method, if an eNB configured in an MTC UE operates in the standalone system and the M-PSS (information) is configured to be transmitted through the 6 symbols (5$^{th}$, 6$^{th}$, 9$^{th}$, 10$^{th}$, 12$^{th}$ and 13$^{th}$ symbols), the MTC UE may first determine whether a corresponding system is the standalone system through M-PSS detection. Furthermore, the MTC UE is aware that the M-PSS (information) is transmitted through the 6 symbols (5$^{th}$, 6$^{th}$, 9$^{th}$, 10$^{th}$, 12$^{th}$ and 13$^{th}$ symbols), and thus may attempt M-PSS detection using the 6 symbols (5$^{th}$, 6$^{th}$, 9$^{th}$, 10$^{th}$, 12$^{th}$ and 13$^{th}$ symbols) when detecting a next M-PSS.

In contrast, although an eNB configured in an MTC UE operates in the standalone system, if an M-PSS (information) is configured to be transmitted through the 9 symbols (5$^{th}$~13$^{th}$ symbols), the MTC UE may first determine whether a corresponding system is the standalone system through M-PSS detection. Furthermore, the MTC UE is aware that the M-PSS (information) is transmitted through the 9 symbols (5$^{th}$~13$^{th}$ symbols), and thus may attempt M-PSS detection using the 9 symbols (5$^{th}$~13$^{th}$ symbols) when detecting a next M-PSS.

If an eNB transmits M-PSSs using the 9 symbols, it may transmit some M-PSSs (information) that belong to the M-PSSs and that correspond to the 6 symbols (e.g., 5$^{th}$, 6$^{th}$, 9$^{th}$, 10$^{th}$, 12$^{th}$ and 13$^{th}$ symbols) through the 6 symbols, and may transmit the remaining M-PSSs (information) corresponding to three symbols (e.g., 7$^{th}$, 8$^{th}$ and 11$^{th}$ symbols) through the remaining three symbols. In this case, the MTC UE may attempt M-PSS detection using the first 6 symbols (5$^{th}$, 6$^{th}$, 9$^{th}$, 10$^{th}$, 12$^{th}$ and 13$^{th}$ symbols). In this case, if the M-PSS detection is successful, the MTC UE can be aware whether an M-PSS/M-SSS is transmitted through some symbols from the eNB. If the M-PSS detection fails, the MTC UE may reattempt M-PSS detection using the 9 symbols (5$^{th}$~13$^{th}$ symbols) when detecting a next M-PSS.

Structure of M-PSS using Differential Encoding

In generating an M-PSS, a method using differential encoding may be taken into consideration.

For example, 108 samples may be generated by attaching one reference sample to the M-PSS sequence of 107 samples. The generated 108 samples may be grouped every 9 samples and divided into 12 sample groups. Each of the divided 12 sample groups may be transmitted through one symbol (12 subcarriers). Differential encoding is continuously performed from the start to the end. Accordingly, if sample groups are transmitted by skipping one symbol halfway, a UE may have a difficulty in decoding an M-PSS sequence.

In order to supplement such a disadvantage, this specification proposes a method of first generating a subsequence, including a reference sample in each subsequence, and separately performing differential encoding.

For example, since 12 samples (i.e., one sample group) are transmitted through each symbol, 7 samples other than one reference sample may be transmitted through 9 symbols. As a result, this results in a form in which a total of 91 sequences is divided through 99 symbols and transmitted. Such a method has a shorter transmittable sequence length compared to the existing method, but has an advantage in that it can improve detection performance of an M-PSS by a UE when the M-PSS is transmitted in a form in which a symbol in which legacy information is transmitted is skipped.

Location of Subframe in/to which Synchronization Signal is Transmitted/Mapped within Radio Frame If the in-band system is taken into consideration, in order for a narrow band system using one resource block to coexist with a legacy LTE system, an M-PSS/M-SSS should not have a great influence on the legacy LTE system and should not be greatly influenced by the legacy LTE system. Accordingly, a configuration/restriction may be performed so that an M-PSS/M-SSS of NB-LTE is not transmitted/mapped in/to subframes which may be configured as MBSFN subframes of the legacy LTE system.

The reason why such a configuration/restriction is necessary is that if an M-PSS/M-SSS of NB-LTE is transmitted through an MBSFN subframe in which a legacy eNB transmits a PMCH, the M-PSS/M-SSS of NB-LTE generates interference/collision with the PMCH and thus a UE may have a difficulty in normally/successfully receiving/detecting both the M-PSS/M-SSS and the PMCH. Accordingly, this specification proposes that the M-PSS/M-SSS is mapped to subframes other than an MBSFN subframe in a legacy system and transmitted, and an example thereof is shown in FIG. 25.

Figure 28:
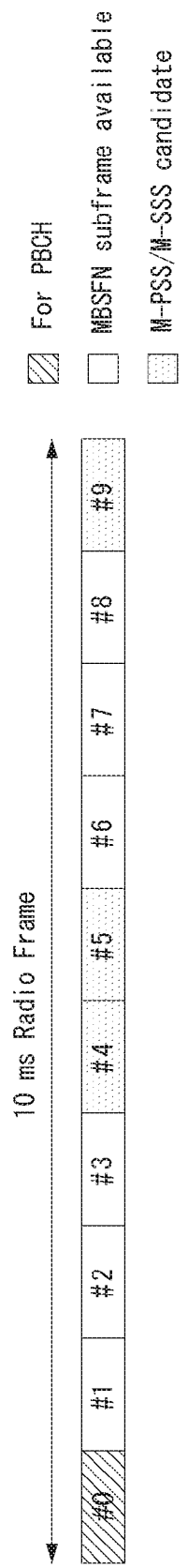
FIG. 28 is a diagram showing candidate subframes to which an M-PSS and M-SSS according to an embodiment of the present invention may be mapped/transmitted.

FIG. 28 is a diagram showing candidate subframes to which an M-PSS and M-SSS according to an embodiment of the present invention may be mapped/transmitted. Hereinafter, in describing the location of a subframe, the locations of subframes sequentially counted based on a "1$^{st}$ (first) subframe", that is, the first subframe, are described (e.g., 1$^{st}$, 2$^{nd}$, and 3$^{rd}$).

Referring to FIG. 28, in the legacy LTE system, #1 (or second), #2 (or third), #3 (or fourth), #6 (or seventh), #7 (or eighth), and #8 (or ninth) subframe within one radio frame may be designated/configured as MBSFN subframes, and a PBCH may be transmitted in the #0 (or first) subframe.

Accordingly, an M-PSS/M-SSS may be transmitted in the #4 (or fifth), #5 (or sixth), and #9 (or tenth) subframes within one radio frame within the legacy LTE system.

This may be construed as including the meaning that the M-PSS or the M-SSS may be transmitted in at least one subframe of the #4 (or fifth), #5 (or sixth) and #9 (or tenth) subframes.

That is, this means that the M-PSS or the M-SSS may be transmitted in all of the #4 (or fifth), #5 (or sixth), and #9 (or tenth) subframes or may be transmitted in one or two of the #4 (or fifth), #5 (or sixth), and #9 (or tenth) subframes.

Of course, it is preferred that the M-PSS/M-SSS is not mapped to a symbol that may have an influence on the legacy LTE system within the #4 (or fifth), #5 (or sixth) and #9 (or tenth) subframes (e.g., mapping to a symbol in which a control channel, such as a PDCCH, a CRS or a legacy PSS/SSS, is transmitted/mapped).

This includes the meaning that an M-PSS and/or an M-SSS is not transmitted in at least one symbol that belongs to symbols of a subframe in which the M-PSS and/or the M-SSS is transmitted and in which a reference signal, such as a CRS (common RS or cell-specific RS), is transmitted.

That is, if a symbol in which an M-PSS and/or an M-SSS will be transmitted overlaps a symbol in which a reference signal, such as a CRS, is transmitted, the reference signal may be first transmitted in the corresponding symbol compared to the M-PSS and/or the M-SSS. That is, the reference signal is mapped to the symbol and transmitted with higher priority than that of the M-PSS and/or the M-SSS.

The aforementioned embodiment/description is not limited to the M-PSS/M-SSS and may be applied to other signals of an NB-LTE system into which the in-band system is taken into consideration identically/similarly.

Additionally as in Table 1, from a viewpoint of the frame structure type 2 (i.e., TDD), a subframe which may be transmitted from an eNB to a UE may be different depending on an uplink-downlink configuration.

When transmitting a downlink subframe, an eNB may transmit an M-PSS/M-SSS/M-PBCH to a UE. Accordingly, in order to select a more preferred/efficient location of a candidate subframe in which the M-PSS/M-SSS can be transmitted, the following two embodiments may be taken into consideration.

In a first embodiment, there may be a method of configuring the #0 (or first), #5 (or sixth) or #9 (or tenth) subframe (within one radio frame) other than uplink-downlink configuration #0 as a subframe to which an M-PSS/M-SSS/M-PBCH is transmitted/mapped.

In a second embodiment, there may be a method of configuring the #0 (or first), #4 (or first), #5 (or first) or #9 (or first) subframe (within one radio frame) other than uplink-downlink configurations #0, #3 and #6 as a subframe in which an M-PSS/M-SSS/M-PBCH is transmitted/mapped. In this case, assuming that the M-PBCH is transmitted through the #0 (or first) subframe, the M-PSS and the M-SSS may be transmitted through two subframes of the #4, #5 and #9 subframes, respectively.

However, in this case, if two of the #4, #5 and #9 subframes are selected and the M-PSS and the M-SSS are transmitted, only four of the 7 uplink-downlink configurations are satisfied with reference to Table 1. In contrast, if the #5 and #9 subframes are selected and the M-PSS and the M-SSS are transmitted, six of the 7 uplink-downlink configurations can be satisfied with reference to Table 1.

Accordingly, a configuration is preferred so that the #5 subframe and the #9 subframe are selected and the M-PSS and the M-SSS are transmitted. In other words, as the second embodiment, there is proposed that the #5 and #9 subframes are designated/configured as candidate subframes to be used to map/transmit the M-PSS/M-SSS.

When the aforementioned first and second embodiments are taken into consideration, the location of a subframe common to the first and the second embodiments corresponds to the #5 (or first) and #9 (or first) subframes. Accordingly, this specification proposes that the locations of the #5 (or sixth) subframe and the #9 (or tenth) subframe which satisfy more uplink-downlink configurations and may be applied to each embodiment in common as the location of a subframe to which the M-PSS/M-SSS may be transmitted/mapped. Specifically, this specification proposes that the #5 (or sixth) subframe is configured as a subframe in which the M-PSS is mapped/transmitted and the #9 (or tenth) subframe is configured as a subframe in which the M-SSS is mapped/transmitted.

For convenience of description, hereinafter, a case where the locations of candidate subframes in which an M-PSS/M-SSS may be transmitted are the #4, #5 and #9 subframes as proposed in relation to FIG. 25 is basically described. However, the present invention is not limited thereto, and the following description may be applied to an embodiment in which the location of a candidate subframe is that of the #5 and #9 subframes identically/similarly.

The M-PSS and the M-SSS may be properly disposed within subframes, respectively, and related embodiments are described later with reference to the following drawings. In the following embodiments, it is preferred that the M-PSS and the M-SSS are mapped by avoiding a control channel in order to not influence the legacy LTE system. Accordingly, each of the M-PSS and the M-SSS may be configured to be mapped to a specific (or preset) number of OFDM symbols (or to occupy a specific number of symbols).

Figure 29:
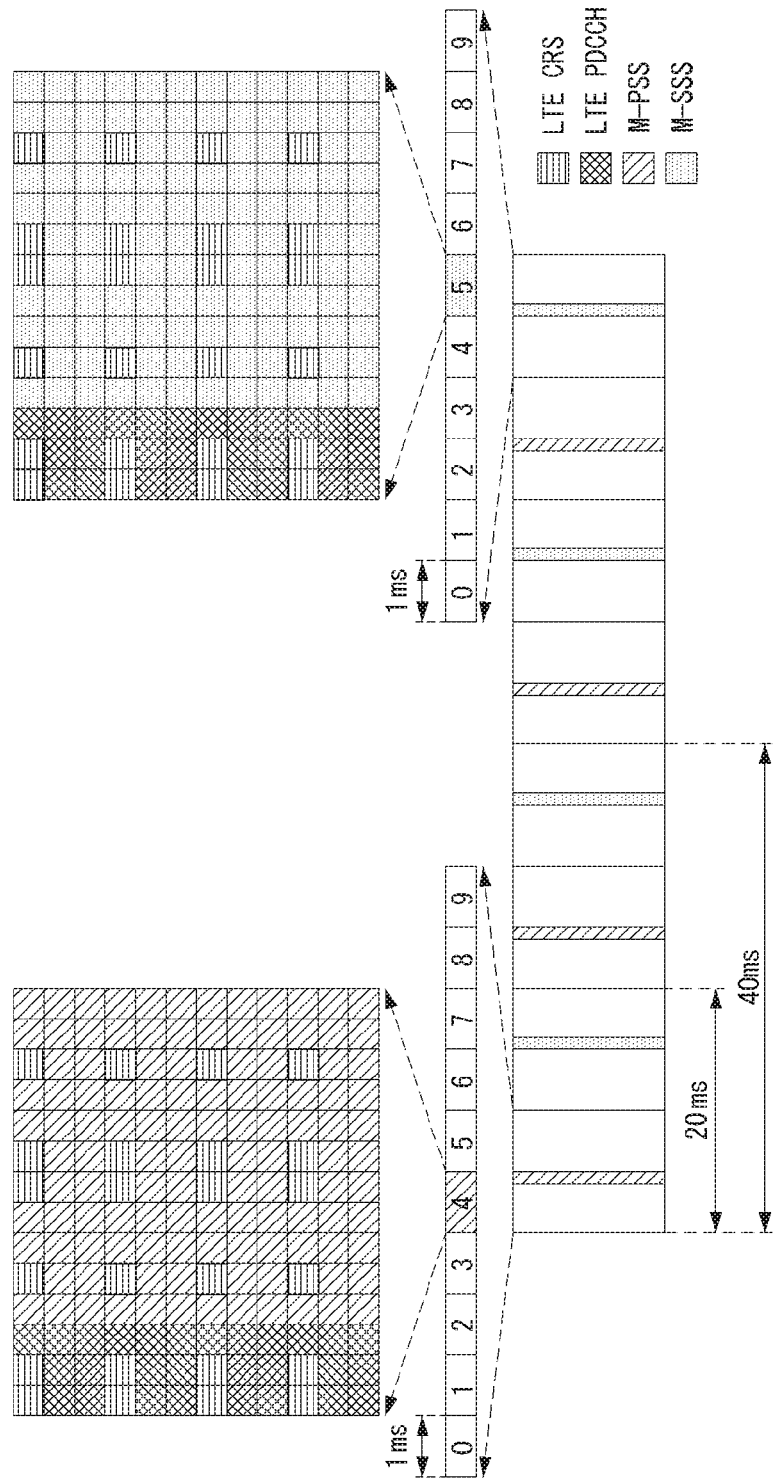
FIG. 29 is a diagram showing an embodiment in which an M-PSS and M-SSS are transmitted using one subframe, but the transmission peroids of the M-PSS and the M-SSS are identically set.

FIG. 29 is a diagram showing an embodiment in which an M-PSS and an M-SSS are transmitted using one subframe, but the transmission peroids of the M-PSS and the M-SSS are identically set.

An M-PSS and an M-SSS may be transmitted through/using one subframe every preset/specific period. For example, one of #4, #5 and #9 subframes may be designated/configured as a subframe in which an M-PSS is transmitted, and one of the remaining two subframes other than the corresponding subframe may be designated/configured as a subframe in which an M-SSS is transmitted. Alternatively, if the M-PSS and the M-SSS are transmitted through different radio frames, they may be configured to be mapped to one or two of the #4, #5 and #9 subframes and to be transmitted.

In this case, the transmission peroids of the M-PSS and the M-SSS may be identically set as a value at which the M-PSS and the M-SSS may be constantly transmitted every M-PBCH TTI burst, such as 10 ms, 20 ms, 40 ms or 80 ms. For example, as shown in FIG. 26, a case where both the M-PSS and the M-SSS use 11 OFDM symbols, the M-PSS uses the #4 subframe, the M-SSS uses the #5 subframe, and the transmission peroid of each of the M-PSS and the M-SSS is set to 20 ms may be assumed. In the case of this drawing, in particular, a case where the M-PSS and the M-SSS are transmitted through different radio frames is illustrated. Although not shown in this drawing, a case where the M-PSS and the M-SSS are transmitted through the same radio frame may also be taken into consideration. In this case, if the transmission peroids of the M-PSS and the M-SSS are the same as 10 ms, the M-PSS and the M-SSS are transmitted through only the same radio frame.

Figure 30:
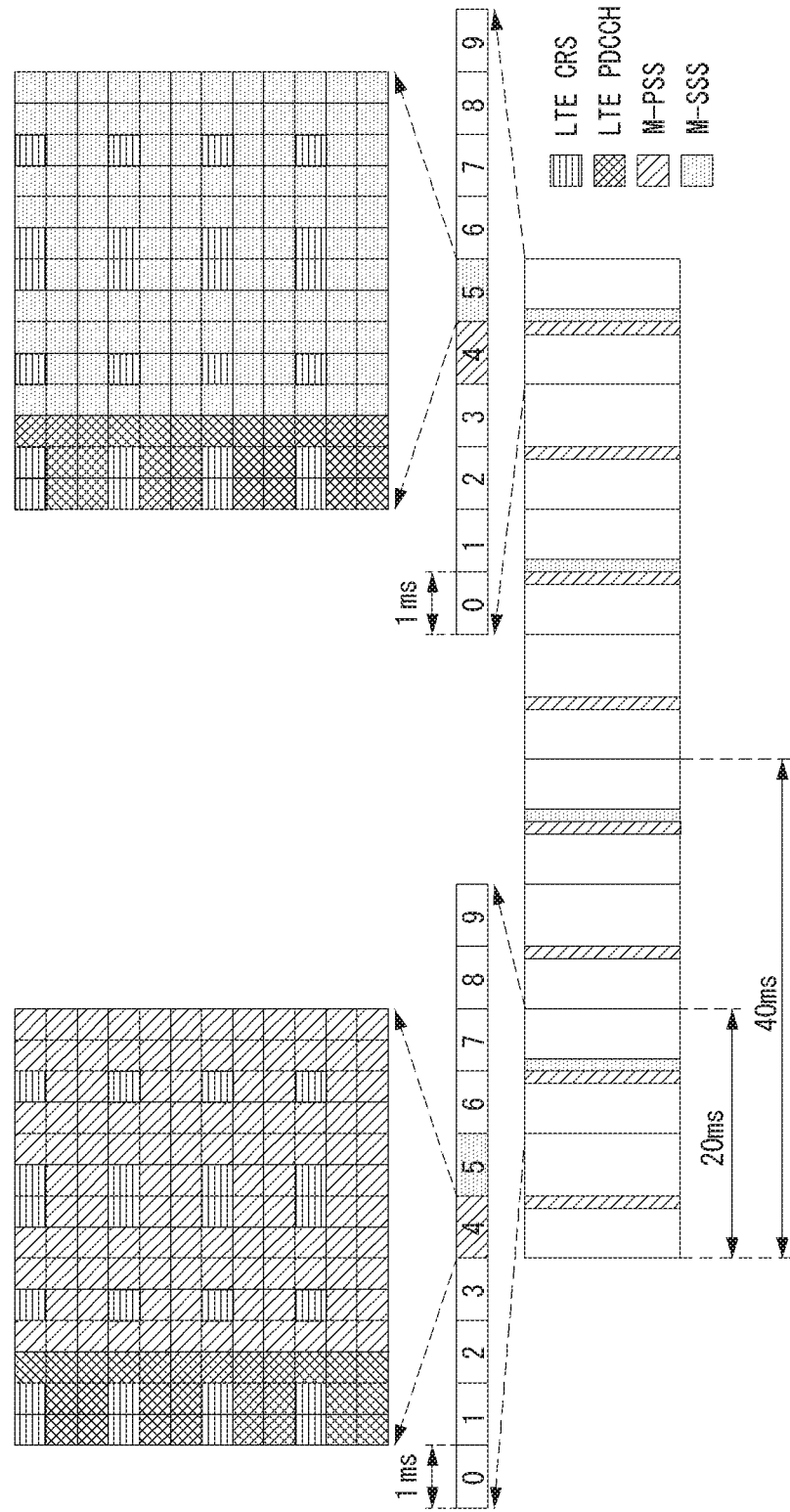
FIG. 30 is a diagram showing an embodiment in which an M-PSS and M-SSS are transmitted using one subframe, but the transmission peroids of the M-PSS and the M-SSS are differently set.

FIG. 30 is a diagram showing an embodiment in which an M-PSS and M-SSS are transmitted using one subframe, but the transmission peroids of the M-PSS and the M-SSS are differently set.

An M-PSS and an M-SSS may be transmitted through/ using one subframe every preset/specific period. For example, one of #4, #5 and #9 subframes may be designated/ configured as a subframe in which the M-PSS is transmitted, and one of the remaining two subframes other than the corresponding subframe may be designated/configured as a subframe in which the M-SSS is transmitted. Alternatively, if the M-PSS and the M-SSS are transmitted through different radio frames, they may be configured to be mapped to one or two of the #4, #5 and #9 subframes and to be transmitted.

In this case, different transmission peroids of the M-PSS and the M-SSS may be set to have values at which they may be constantly transmitted every M-PBCH TTI burst, such as 10 ms, 20 ms, 40 ms or 80 ms.

For example, as shown in FIG. 27, both the M-PSS and the M-SSS may use 11 OFDM symbols, the M-PSS may use the #4 subframe (or #5 subframe/#6 subframe), the M-SSS may use the #5 subframe (or #9 subframe/#11 subframe), the transmission period of the M-PSS may be set to 10 ms, and the transmission peroid of the M-SSS may be set to 20 ms.

In other words, the M-PSS may be mapped to the #4 subframe (or #5 subframe/#6 subframe) (i.e., for each radio frame) of each radio frame and transmitted. The M-SSS may be transmitted in the #5 subframe (or #9 subframe/#11 subframe) of every other radio frame (i.e., every two radio frames).

Meanwhile, in the embodiments of FIGS. 26 and 27, the number of OFDM symbols to which the M-PSS and the M-SSS are occupied/mapped is 11, and may correspond to all of the remaining OFDM symbols other than OFDM symbols occupied by legacy signals, such as a legacy PDCCH, within one subframe to which the M-PSS or the M-SSS is mapped. That is, all of OFDM symbols that may be occupied by the M-PSS/M-SSS without affecting the legacy system may be configured to be occupied by the M-PSS/M-SSS.

The reason for this is that the following effects/advantages are generated as the number of OFDM symbols occupied by the M-PSS/M-SSS increases.

First, there is an effect in that a UE can determine/decode a corresponding M-PSS/M-SSS more accurately because the length of a sequence used as the M-PSS/M-SSS may be longer as the number of OFDM symbols to which the M-PSS/M-SSS is mapped increases. For example, it may be assumed a ZC sequence is used as the M-PSS/M-SSS. In this case, in terms of the characteristics of the ZC sequence, the number of available root indices increases as the length of the sequence increases. Accordingly, more information related to the ZC sequence may be included in the M-PSS/ M-SSS and transmitted. Furthermore, in terms of the characteristics of the ZC sequence, a cross correlation value is reduced as the length of the sequence increases. Accordingly, as the number of OFDM symbols in which the M-PSS/M-SSS is transmitted increases, a UE can determine/ decode the M-PSS/M-SSS more accurately.

Second, when several sequences of a short length are mapped/disposed for each symbol, the length of additionally used cover code is longer as the number of OFDM symbols occupied by an M-PSS/M-SSS increases. That is, as the length of cover code is longer, the number of different cover codes increases. Accordingly, the probability that a UE can determine/decode the M-PSS/M-SSS accurately is increased compared to a case where a small number of cover codes is used.

When the aforementioned effects are taken into consideration, the M-PSS and the M-SSS may be configured to occupy all of the remaining OFDM symbols (a maximum of 11 OFDM symbols) other than OFDM symbols occupied by legacy signals, such as a legacy CRS and a legacy PDCCH.

Figure 31:
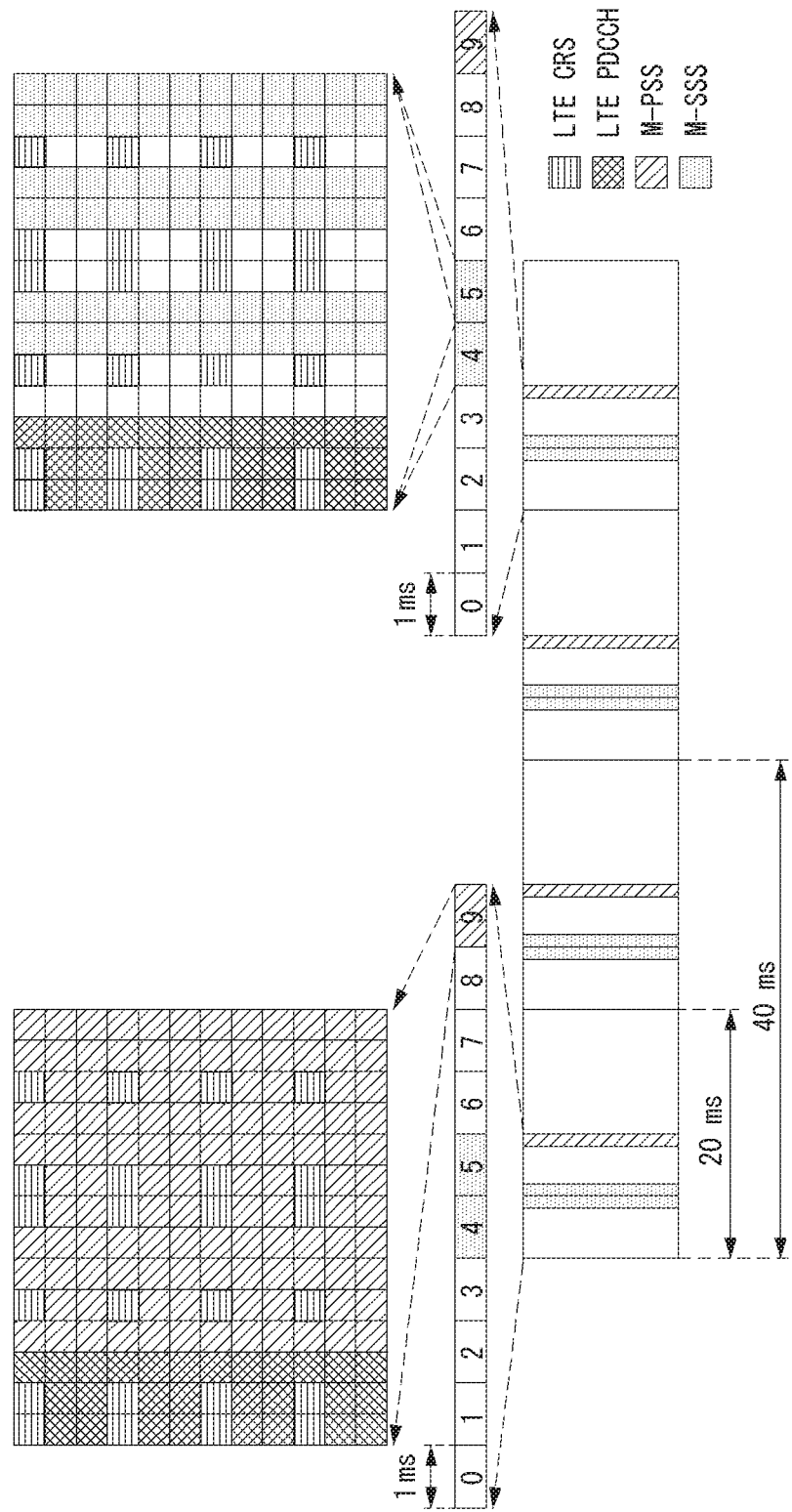
FIGS. 31 and 32 are diagrams showing embodiments in which an M-PSS is transmitted using one subframe and an M-SSS is transmitted using two subframes, but the transmission peroids of the M-PSS and the M-SSS are identically set.
Figure 32:
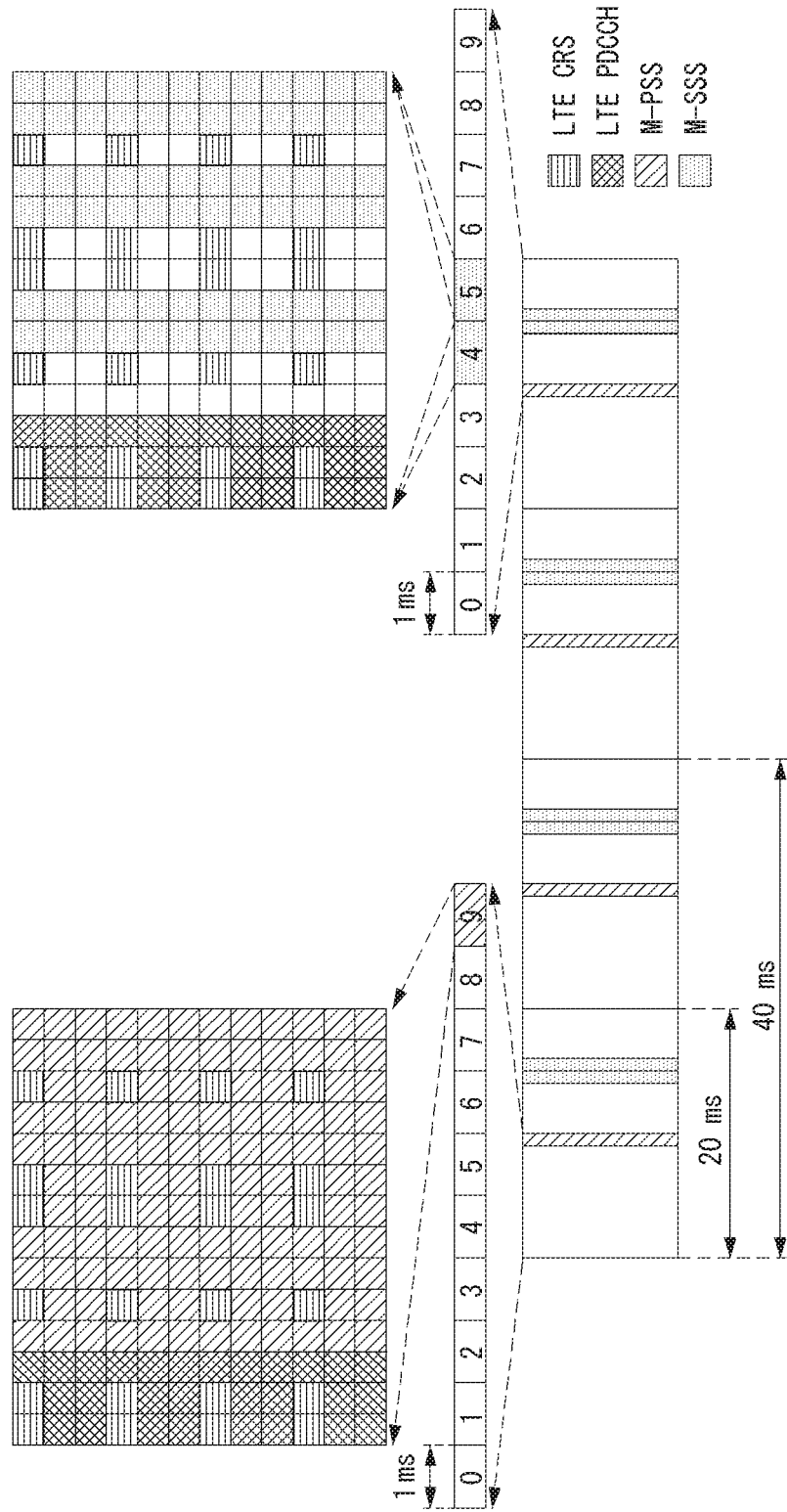

FIGS. 31 and 32 are diagram showing embodiments in which an M-PSS is transmitted using one subframe, an M-SSS is transmitted using two subframes, but the transmission peroids of the M-PSS and the M-SSS are identically set.

FIGS. 31 and 32 correspond to a method of transmitting the M-PSS using one subframe and transmitting the M-SSS using two subframes every specific period. One of #4, #5 and #9 subframes may be designated/configured as a subframe in which the M-PSS is transmitted, and the two subframes other than the corresponding subframe may be designated/configured as subframes in which the M-SSS is transmitted. Unlike the embodiments of FIGS. 26 and 27, the present embodiment has an advantage in that the M-SSS may be mapped by avoiding a time domain (or an OFDM symbol region) to which the CRC of a legacy LTE system is mapped.

If the M-PSS and the M-SSS are transmitted in different radio frames, they may be transmitted in one or two of the #4, #5 and #9 subframes. In this case, the transmission peroids of the M-PSS and the M-SSS may be set as values at which they may be constantly transmitted every M-PBCH TTI burst, such as 10 ms, 20 ms, 40 ms or 80 ms.

For example, the M-PSS may be configured to be transmitted in the #9 subframe, the M-SSS may be configured to be transmitted in the #4 and #5 subframes, and the transmission peroid of each of the M-PSS and the M-SSS may be set to 20 ms. In this case, the M-PSS may be transmitted using 11 OFDM symbols within one subframe, and the M-SSS may be transmitted using a total of 12 OFDM symbols, wherein 6 OFDM symbols are included in each of the two subframes. In this case, FIG. 28 illustrates a case where the M-PSS and the M-SSS are transmitted in the same radio frame, and FIG. 29 illustrates a case where the M-PSS and the M-SSS are transmitted in different radio frames. If the transmission peroids of the M-PSS and the M-SSS are 10 ms, the M-PSS and the M-SSS are transmitted in the same radio frame.

Additionally, downlink data may be configured to be transmitted in symbols left after the M-SSS is transmitted within a subframe in which the M-SSS will be transmitted. Alternatively, a configuration may be performed so that an additional RS is transmitted in the remaining symbols or the M-SSS is repeated in order to increase RS density without transmitting downlink data.

Figure 33:
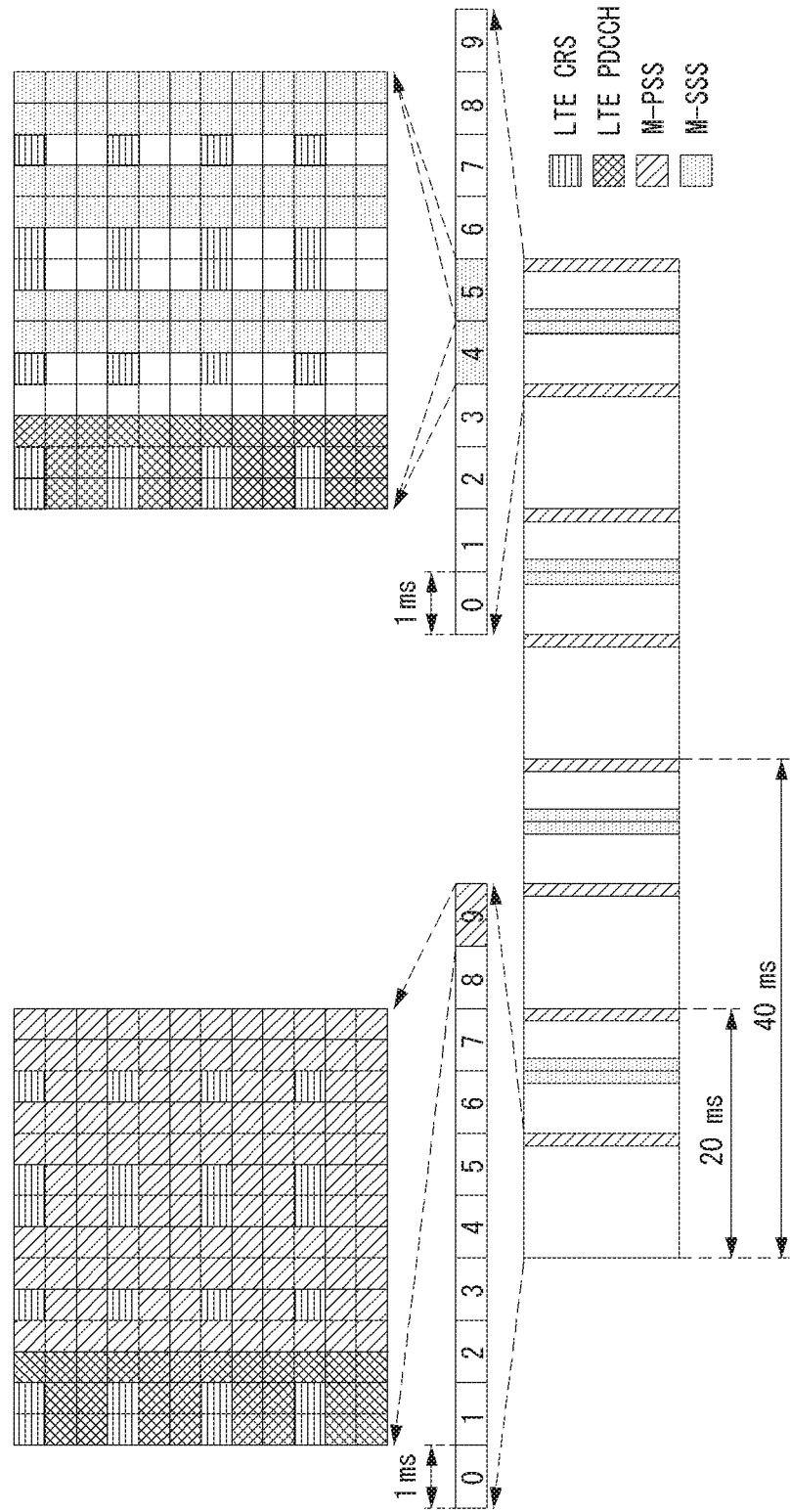
FIG. 33 is a diagram showing an embodiment in which an M-PSS is transmitted using one subframe and an M-SSS is transmitted using two subframes, but the transmission periods of the M-PSS and the M-SSS are differently set.

FIG. 33 is a diagram showing an embodiment in which an M-PSS is transmitted using one subframe and an M-SSS is transmitted using two subframes, but the transmission peroids of the M-PSS and the M-SSS are differently set.

FIG. 33 is a method of transmitting the M-PSS and the M-SSS in different transmission peroids, but transmitting the M-PSS in one subframe and transmitting the M-SSS in two subframes. In the present embodiment, one of #4, #5 and #9 subframes may be designated/configured as a subframe in which the M-PSS is transmitted, and all of the two subframes other than the corresponding subframe may be designated/configured as subframes in which the M-SSS is transmitted.

If the M-PSS and the M-SSS are transmitted in different radio frames, they may be transmitted in one or two of the #4, #5 and #9 subframes. In this case, the transmission peroids of the M-PSS and the M-SSS may be constantly transmitted every M-PBCH TTI burst, such as 10 ms, 20 ms, 40 ms or 80 ms.

For example, as shown in FIG. 33, the M-PSS may be configured to be transmitted in the #9 subframe, the M-SSS may be configured to be transmitted in the #4 and #5 subframes, the transmission peroid of the M-PSS may be set to 10 ms, and the transmission peroid of the M-SSS may be set to 20 ms. In this case, the M-PSS may be transmitted using 11 OFDM symbols within one subframe, and the M-SSS may be transmitted using a total of 12 OFDM symbols, wherein 6 OFDM symbols are included in each of the two subframe.

Figure 34:
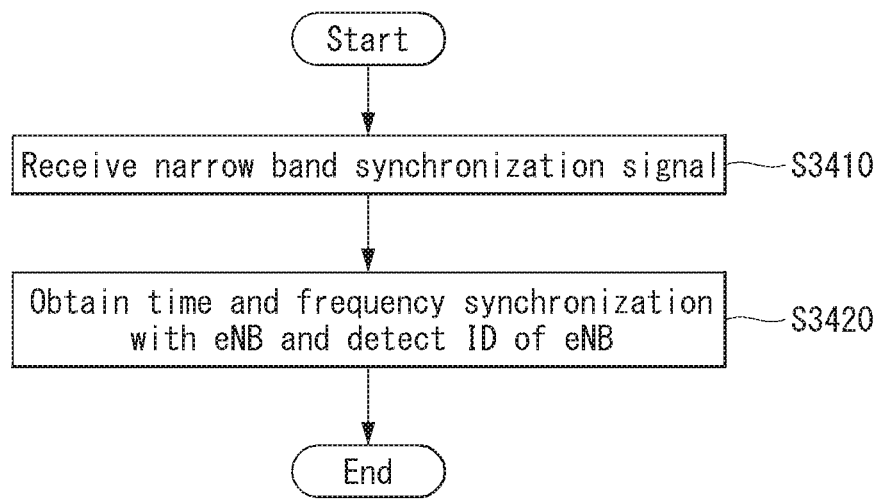
FIG. 34 is a flowchart illustrating a cell search method of a UE according to an embodiment of the present invention.

FIG. 34 is a flowchart illustrating a cell search method of a UE according to an embodiment of the present invention. The description of FIGS. 1 to 33 may be applied to the present flowchart identically/similarly. Accordingly, a redundant description is hereunder omitted. A case where the UE of the flowchart is a UE operating in the in-band system is described.

First, the UE may receive a narrow band synchronization signal (S3410). More specifically, the UE may receive a narrow band synchronization signal through a narrow band of a radio frame from an eNB. In this case, the narrow band has an 180-kHz system bandwidth and includes 12 carriers spaced with 15 kHz. The narrow band synchronization signal may be generated using a Zadoff-Chu (ZC) sequence and may be transmitted through 11 OFDM symbols.

The narrow band synchronization signal may include a narrow band primary synchronization signal and a narrow band secondary synchronization signal. In this case, the narrow band primary synchronization signal may be called an M-PSS, and the narrow band secondary synchronization signal may be called an M-SSS. The transmission peroids of the narrow band primary synchronization signal and the narrow band secondary synchronization signal may be differently set. For example, the transmission peroid of the narrow band primary synchronization signal may be set to 10 ms, and the transmission peroid of the narrow band secondary synchronization signal may be set to 20 ms.

The narrow band primary synchronization signal may be transmitted in the sixth subframe of a radio frame, and the narrow band secondary synchronization signal may be transmitted in the tenth subframe of the radio frame. In this case, the narrow band synchronization signal may not be transmitted in at least one symbol in which a reference signal is transmitted among symbols of the sixth subframe and the symbols of the tenth subframe. Furthermore, the sixth subframe and the tenth subframe may correspond to subframes not configured as a multicast broadcast single frequency network (MBSFN) subframe.

Finally, the UE may obtain time synchronization and frequency synchronization with the eNB based on the narrow band synchronization signal, and may detect the ID of an eNB. That is, the UE performs a cell search procedure based on the narrow band synchronization signal.

Figure 35:
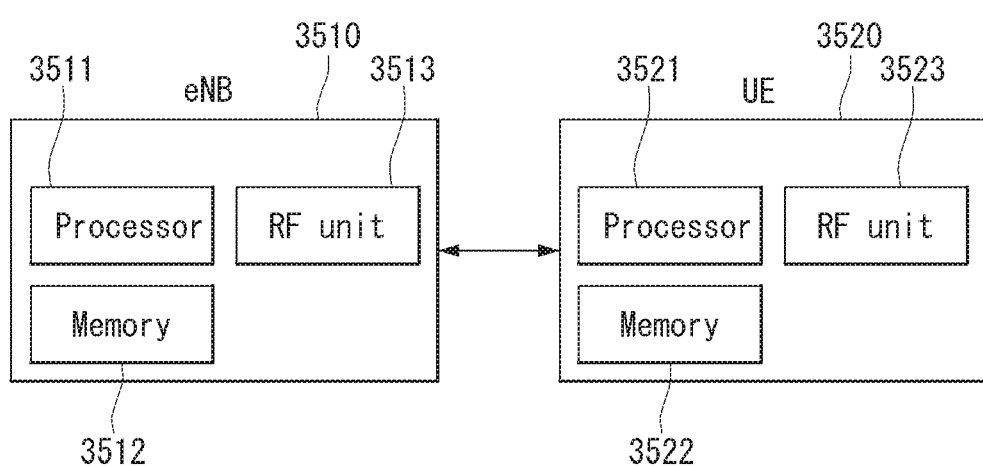
FIG. 35 illustrates a block diagram of a wireless communication apparatus according to an embodiment of the present invention.

General Apparatus to which an Embodiment of the Present Invention May be Applied FIG. 35 illustrates a block diagram of a wireless communication apparatus according to an embodiment of the present invention.

Referring to FIG. 35, the wireless communication system includes an eNB 3510 and a plurality of pieces of UE 3520 located within the area of the eNB 3510.

The eNB 3510 includes a processor 3511, memory 3512, and a radio frequency (RF) unit 3513. The processor 3511 implements the functions, processes and/or methods proposed in FIGS. 1 to 34. The layers of a wireless interface protocol may be implemented by the processor 3511. The memory 3512 is connected to the processor 3511 and stores various pieces of information for driving the processor 3511. The RF unit 3513 is connected to the processor 3511 and transmits and/or receives a radio signal.

The UE 3520 includes a processor 3521, memory 3522, and an RF unit 3523. The processor 3521 implements the functions, processes and/or methods proposed in FIGS. 1 to 34. The layers of a wireless interface protocol may be implemented by the processor 3521. The memory 3522 is connected to the processor 3521 and stores various pieces of information for driving the processor 3521. The RF unit 3523 is connected to the processor 3521 and transmits and/or receives a radio signal.

The memory 3512, 3522 may be inside or outside the processor 3511, 3521 and connected to the processor 3511, 3521 by various well-known means. Furthermore, the eNB 3510 and/or the UE 3520 may have a single antenna or multiple antennas.

In the aforementioned embodiments, the elements and characteristics of the present invention have been combined in specific forms. Each of the elements or characteristics may be considered to be optional unless otherwise described explicitly. Each of the elements or characteristics may be implemented in such a way as to be not combined with other elements or characteristics. Furthermore, some of the elements and/or the characteristics may be combined to form an embodiment of the present invention. The order of the operations described in connection with the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

An embodiment of the present invention may be implemented by various means, for example, hardware, firmware, software or a combination of them. In the case of implementations by hardware, an embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers and/or microprocessors.

In the case of an implementation by firmware or software, an embodiment of the present invention may be implemented in the form of a module, procedure, or function for performing the aforementioned functions or operations. Software code may be stored in memory and driven by a processor. The memory may be located inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

MODE FOR INVENTION

Various forms for an implementation of the invention have been described in the best form for an implementation of the invention.

INDUSTRIAL APPLICABILITY

The present invention has been described based on an example in which the present invention is applied to the 3GPP LTE/LTE-A systems, but may be applied to various wireless communication systems in addition to the 3GPP LTE/LTE-A systems.

What is claimed is:

1. A method of performing, by a user equipment (UE), cell search in a wireless communication system, the method comprising:
receiving, from a base station (BS), a Narrowband Primary Synchronization Signal (NPSS) and a Narrowband Secondary Synchronization Signal (NSSS); and
acquiring time synchronization and frequency synchronization with the BS and detecting an identifier of the BS based on the NPSS and the NSSS,
wherein the NPSS is transmitted in a sixth subframe of a each frame of a plurality of frames, and
wherein the NSSS is transmitted in a tenth subframe of a every other frame of the plurality of frames.

2. The method of claim 1, wherein the NPSS and the NSSS are not transmitted in at least one symbol in which a reference signal (RS) is transmitted among symbols of the sixth subframe and the tenth subframe.

3. The method of claim 1, wherein the sixth subframe and the tenth subframe are subframes not configured as a multicast broadcast single frequency network (MBSFN) subframe.

4. The method of claim 1, wherein transmission periods of the NPSS and the NSSS are differently configured.

5. The method of claim 4, wherein:
the transmission period of the NPSS is set to 10 ms, and
the transmission period of the NSSS is set to 20 ms.

6. The method of claim 1, wherein the NPSS and the NSSS are generated using a Zadoff-Chu (ZC) sequence.

7. The method of claim 1, wherein the NPSS and the NSSS are transmitted through 11 orthogonal frequency-division multiple access (OFDMA) symbols.

8. The method of claim 1, wherein the NSSS is transmitted through 12 subcarriers in the tenth subframe.

9. The method of claim 1,
wherein the UE operates in an in-band system, and
wherein the NPSS and the NSSS are transmitted through a narrowband (NB) including 12 carriers spaced with 15 kHz.

10. A user equipment (UE) performing cell search in a wireless communication system, the UE comprising:
a transceiver configured to transmit and receive a radio signal; and
a processor configured to control the transceiver,
wherein the processor is further configured to:
receive, from a base station (BS), a Narrowband Primary Synchronization Signal (NPSS) and a Narrowband Secondary Synchronization Signal (NSSS), and
acquire time synchronization and frequency synchronization with the BS, and detect an identifier of the BS based on the NPSS and the NSSS,
wherein the NPSS is transmitted in a sixth subframe of a each frame of a plurality of frames, and
wherein the NSSS is transmitted in a tenth subframe of a every other frame of the plurality of frames.

11. The UE of claim 10, wherein the NPSS and the NSSS are not transmitted in at least one symbol in which a reference signal (RS) is transmitted among symbols of the sixth subframe and tenth subframe.

12. The UE of claim 10, wherein the sixth subframe and the tenth subframe are subframes not configured as a multicast broadcast single frequency network (MBSFN) subframe.

13. The UE of claim 10, wherein:
a transmission period of the NPSS is set to 10 ms, and
a transmission period of the NSSS is set to 20 ms.

14. The UE of claim 10, wherein the NPSS and the NSSS are transmitted through 11 orthogonal frequency-division multiple access (OFDMA) symbols.

15. The UE of claim 10, wherein the NSSS is transmitted through 12 subcarriers in the tenth subframe.

* * * * *